(12) United States Patent
Kanai et al.

(10) Patent No.: US 7,952,811 B2
(45) Date of Patent: May 31, 2011

(54) ZOOM LENS AND IMAGE PICKUP DEVICE

(75) Inventors: Makoto Kanai, Tokyo (JP); Daisuke Kuroda, Kanagawa (JP); Takumi Matsui, Tokyo (JP); Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 12/461,449

(22) Filed: Aug. 12, 2009

(65) Prior Publication Data

US 2010/0060993 A1 Mar. 11, 2010

(30) Foreign Application Priority Data

Sep. 5, 2008 (JP) ................ 2008-228462

(51) Int. Cl.
*G02B 15/14* (2006.01)
*H04N 5/262* (2006.01)
(52) U.S. Cl. ...... 359/682; 359/680; 359/689; 348/240.3
(58) Field of Classification Search ............... 348/240.3, 348/340; 359/680, 682, 689, 708
See application file for complete search history.

(56) References Cited

U.S. PATENT DOCUMENTS

| 2009/0303612 A1 | 12/2009 | Fukuta et al. |
| 2010/0123959 A1* | 5/2010 | Kuroda et al. ............ 359/689 |

FOREIGN PATENT DOCUMENTS

| JP | 2003-140046 A | 5/2003 |
| JP | 2003-241089 A | 8/2003 |
| JP | 2004-013169 | 1/2004 |
| JP | 2005-140916 A | 6/2005 |
| JP | 2005-258057 A | 9/2005 |
| JP | 2006-065182 A | 3/2006 |
| JP | 2006-113404 A | 4/2006 |
| JP | 2006-113554 | 4/2006 |
| JP | 2006-208890 A | 8/2006 |
| JP | 2007-140359 | 6/2007 |
| JP | 2007-212636 | 8/2007 |
| JP | 2008-015433 A | 1/2008 |
| JP | 2008-203449 A | 9/2008 |
| JP | 2010-049189 A | 3/2010 |
| WO | WO-2008/075566 A1 | 6/2008 |

* cited by examiner

*Primary Examiner* — David N Spector
(74) *Attorney, Agent, or Firm* — Rader, Fishman & Grauer PLLC

(57) ABSTRACT

Disclosed herein is a zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, the first lens group is moved, and the second lens group is moved to the object side such that an air interval between the first lens group and the second lens group is decreased and such that an air interval between the second lens group and the third lens group is increased.

8 Claims, 33 Drawing Sheets

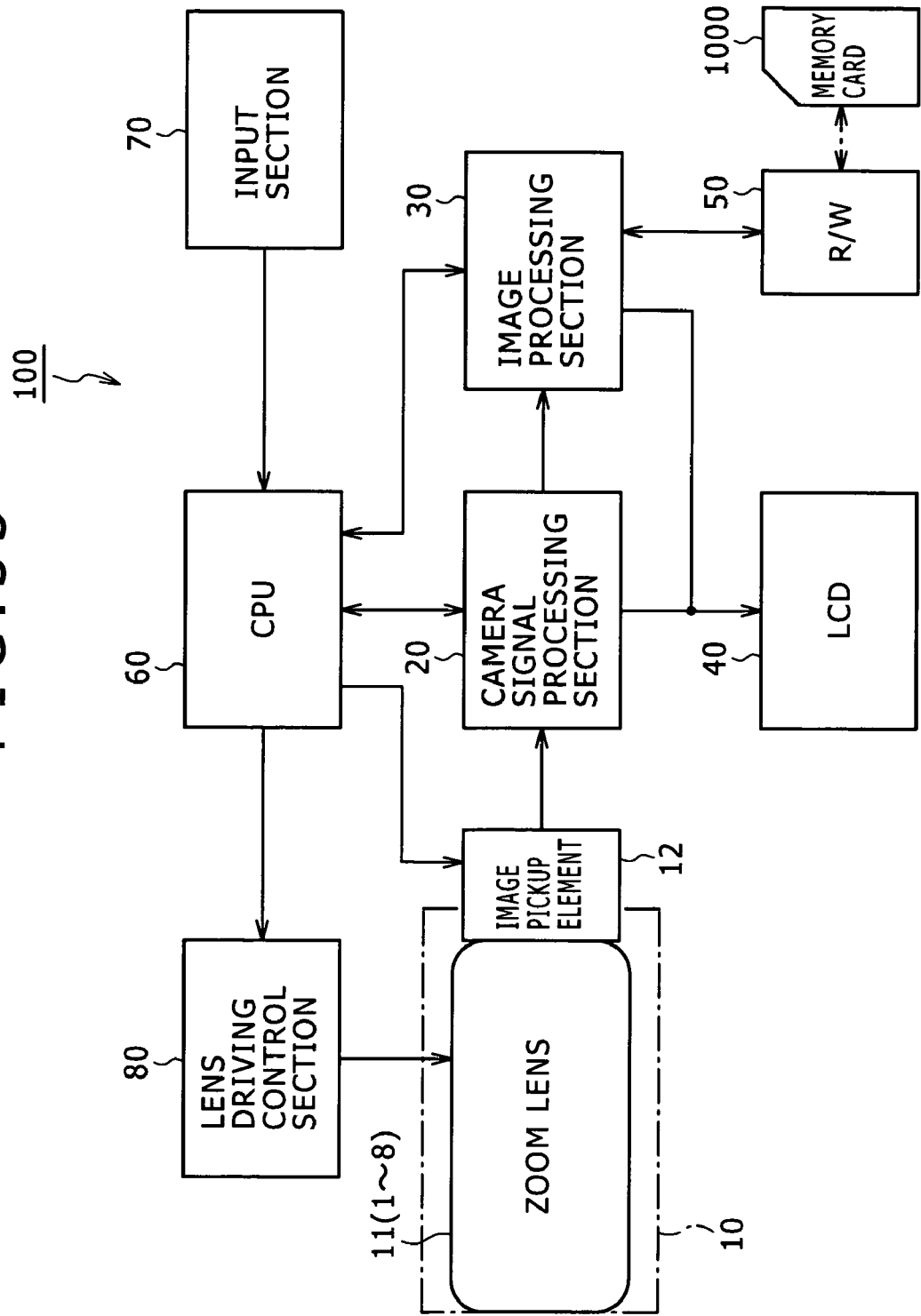

ZOOM LENS AND IMAGE PICKUP DEVICE

BACKGROUND OF THE INVENTION

1. Field of the Invention

The present invention relates to a zoom lens and an image pickup device, and particularly to a technical field of a miniaturized higher-performance zoom lens suitable for a photographing optical system of digital input-output devices such as a digital still camera, a digital video camera and the like and an image pickup device using the zoom lens.

2. Description of the Related Art

Image pickup devices using a solid-state image pickup element such as a digital still camera and the like have recently been spread. With the spread of such image pickup devices such as a digital still camera and the like, even higher image quality is desired. In a digital still camera or the like having a large number of pixels, in particular, there is a desire for a photographing lens, especially a zoom lens, that has excellent image forming performance and which lens is compatible with a solid-state image pickup element having the large number of pixels.

There is also an increasing desire for a wider angle of view as well as higher image quality as described above, and there is a desire for a small zoom lens having a high variable power ratio and a wide angle of view such for example as a half angle of view of more than 40°.

There are many kinds of zoom lenses for digital still cameras. However, as a lens type suitable for achieving a reduced size and a wider angle of view, a three-group zoom lens is known which zoom lens is formed by arranging a first lens group having a negative refractive power, a second lens group having a positive refractive power, and a third lens group having a positive refractive power in order from an object side to an image side (see for example Japanese Patent Laid-Open Nos. 2004-13169, 2006-113554, 2007-212636 and 2007-140359, hereinafter referred to as Patent Documents 1 to 4, respectively).

In the zoom lenses described in Patent Document 1 and Patent Document 2, a wider angle of view is achieved by forming the first lens group by three lenses.

In the zoom lenses described in Patent Document 3 and Patent Document 4, miniaturization is achieved by forming the first lens group by two lenses. In the zoom lens described in Patent Document 4, in particular, miniaturization is achieved by forming the first lens group by two lenses and further actively bringing about distortion aberration.

SUMMARY OF THE INVENTION

However, in the zoom lenses described in Patent Document 1 and Patent Document 2, because the first lens group is formed by three lenses, the first lens group has a long total length in the direction of an optical axis, which hinders miniaturization.

In addition, in the zoom lens described in Patent Document 3, though miniaturization is achieved by forming the first lens group by two lenses, a sufficiently wide angle of view and a sufficiently high variable power ratio are not achieved. Specifically, the zoom lens described in Patent Document 3 has a half angle of view of 40° or less and a variable power ratio of less than 3.8, and is thus not a zoom lens that satisfies a wide angle of view and a high variable power ratio that have recently been desired.

Further, in the zoom lens described in Patent Document 4, miniaturization is achieved by actively bringing about distortion aberration. However, the zoom lens described in Patent Document 4 has a half angle of view of 30° or less and a variable power ratio of about 3.8, and is thus, again, not a zoom lens that satisfies a wide angle of view and a high variable power ratio that have recently been desired.

It is accordingly desirable to provide a zoom lens and an image pickup device that overcome the above-described problems, and which are miniaturized and ensure high optical performance with a wide angle of view and a high variable power ratio.

According to an embodiment of the present invention, there is provided a zoom lens formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved, and the second lens group is moved to the object side such that an air interval between the first lens group and the second lens group is decreased and such that an air interval between the second lens group and the third lens group is increased. The first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Thus, negative distortion aberration and field curvature that occur at the wide-angle end when an angle of view is widened and spherical aberration at the telephoto end which aberration occurs when a variable power ratio is increased are corrected favorably.

In the above-described zoom lens, it is desirable that the surface on the image side of the second lens be formed such that a negative refractive power is weakened as distance from an optical axis is increased, and that the zoom lens be formed so as to satisfy a following conditional expression (1).

$$0.40 < |Sgf/Sgr| < 2.10 \quad (1)$$

where Sgf denotes a difference between an amount of sag of a paraxial radius of curvature of the surface on the object side in an effective diameter of the second lens and an amount of sag of an aspheric shape, and Sgr denotes a difference between an amount of sag of a paraxial radius of curvature of the surface on the image side in the effective diameter of the second lens and an amount of sag of an aspheric shape.

By forming the surface on the image side of the second lens such that a negative refractive power is weakened as distance from an optical axis is increased, and forming the zoom lens so as to satisfy the conditional expression (1), correction of field curvature in the surface on the image side of the second lens is performed favorably, and decentration sensitivity of the second lens is lowered.

It is desirable that the zoom lens be formed so as to satisfy a following conditional expression (2) and a following conditional expression (3).

$$1.00 < |f12/f1| < 2.00 \quad (2)$$

$$1.00 < t1/fw < 1.60 \quad (3)$$

where f12 denotes a focal length of the second lens, f1 denotes a focal length of the first lens group, t1 denotes a thickness on an optical axis of the first lens group, and fw denotes a focal length at the wide-angle end in an entire lens system.

By forming the zoom lens so as to satisfy the conditional expression (2) and the conditional expression (3), the focal length of the second lens is prevented from becoming too short, and amounts of various aberrations occurring in the second lens are decreased. In addition, the thickness of the first lens group is prevented from becoming too large.

It is desirable that the zoom lens be formed so as to satisfy a following conditional expression (4) and a following conditional expression (5).

$$N12>1.90 \tag{4}$$

$$v12<25 \tag{5}$$

where N12 denotes an index of refraction at a d-line of the second lens, and v12 denotes an Abbe number at the d-line of the second lens.

By forming the zoom lens so as to satisfy the conditional expression (4) and the conditional expression (5), the curvature of the second lens does not need to be increased, and chromatic aberration occurring in the first lens group is corrected favorably.

It is desirable that in the above-described zoom lens, the second lens group be formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

By forming the second lens group as described above, the second lens group is formed by a small number of lenses, and the front principal point of the second lens group can be made closer to the object side.

According to an embodiment of the present invention, there is provided an image pickup device including: a zoom lens; and an image pickup element for converting an optical image formed by the zoom lens into an electric signal. In the device, the zoom lens is formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved, and the second lens group is moved to the object side such that an air interval between the first lens group and the second lens group is decreased and such that an air interval between the second lens group and the third lens group is increased. The first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Thus, negative distortion aberration and field curvature that occur at the wide-angle end when an angle of view is widened and spherical aberration at the telephoto end which aberration occurs when a variable power ratio is increased are corrected favorably.

According to an embodiment of the present invention, there is provided a zoom lens formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved, and the second lens group is moved to the object side such that an air interval between the first lens group and the second lens group is decreased and such that an air interval between the second lens group and the third lens group is increased, and the first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Thus, by forming the first lens group by two lenses and forming both surfaces of each of the first lens and the second lens as aspheric surfaces, it is possible to achieve miniaturization and ensure high optical performance with a wider angle of view and a higher variable power.

In one embodiment of the present invention, the surface on the image side of the second lens is formed such that a negative refractive power is weakened as distance from an optical axis is increased, and the zoom lens is formed so as to satisfy a following conditional expression (1).

$$0.40<|Sgf/Sgr|<2.10 \tag{1}$$

where Sgf denotes a difference between an amount of sag of a paraxial radius of curvature of the surface on the object side in an effective diameter of the second lens and an amount of sag of an aspheric shape, and Sgr denotes a difference between an amount of sag of a paraxial radius of curvature of the surface on the image side in the effective diameter of the second lens and an amount of sag of an aspheric shape.

Thus, it is possible to favorably perform aberration correction, especially correction of distortion aberration and field curvature, and to avoid manufacturing difficulty due to a decrease in decentration sensitivity.

In one embodiment of the present invention, the zoom lens is formed so as to satisfy a following conditional expression (2) and a following conditional expression (3).

$$1.00<|f12/f1|<2.00 \tag{3}$$

$$1.00<t1/fw<1.60 \tag{3}$$

where f12 denotes a focal length of the second lens, f1 denotes a focal length of the first lens group, t1 denotes a thickness on an optical axis of the first lens group, and fw denotes a focal length at the wide-angle end in an entire lens system.

It is thus possible to achieve miniaturization by shortening a total optical length, and to ensure high optical performance.

In one embodiment of the present invention, the zoom lens is formed so as to satisfy a following conditional expression (4) and a following conditional expression (5).

$$N12>1.90 \tag{4}$$

$$v12<25 \tag{5}$$

where N12 denotes an index of refraction at a d-line of the second lens, and v12 denotes an Abbe number at the d-line of the second lens.

It is thus possible to improve optical performance, and to avoid manufacturing difficulty.

In one embodiment of the present invention, the second lens group is formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

It is thus possible to shorten a total optical length, and to favorably correct spherical aberration and coma aberration.

According to an embodiment of the present invention, there is provided an image pickup device including: a zoom lens; and an image pickup element for converting an optical image formed by the zoom lens into an electric signal. In the device, the zoom lens is formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved, and the second lens group is moved to the object side such that an air interval between the first lens group and the second lens group is decreased and such that an air interval between the second lens group and the third lens group is increased, and the first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Thus, by forming the first lens group by two lenses and forming both surfaces of each of the first lens and the second lens as aspheric surfaces, it is possible to achieve miniaturization and ensure high optical performance with a wider angle of view and a higher variable power.

BRIEF DESCRIPTION OF THE DRAWINGS

FIG. 33 is a block diagram showing an embodiment of the image pickup device according to the present invention.

DETAILED DESCRIPTION OF THE PREFERRED EMBODIMENTS

Figure 1:
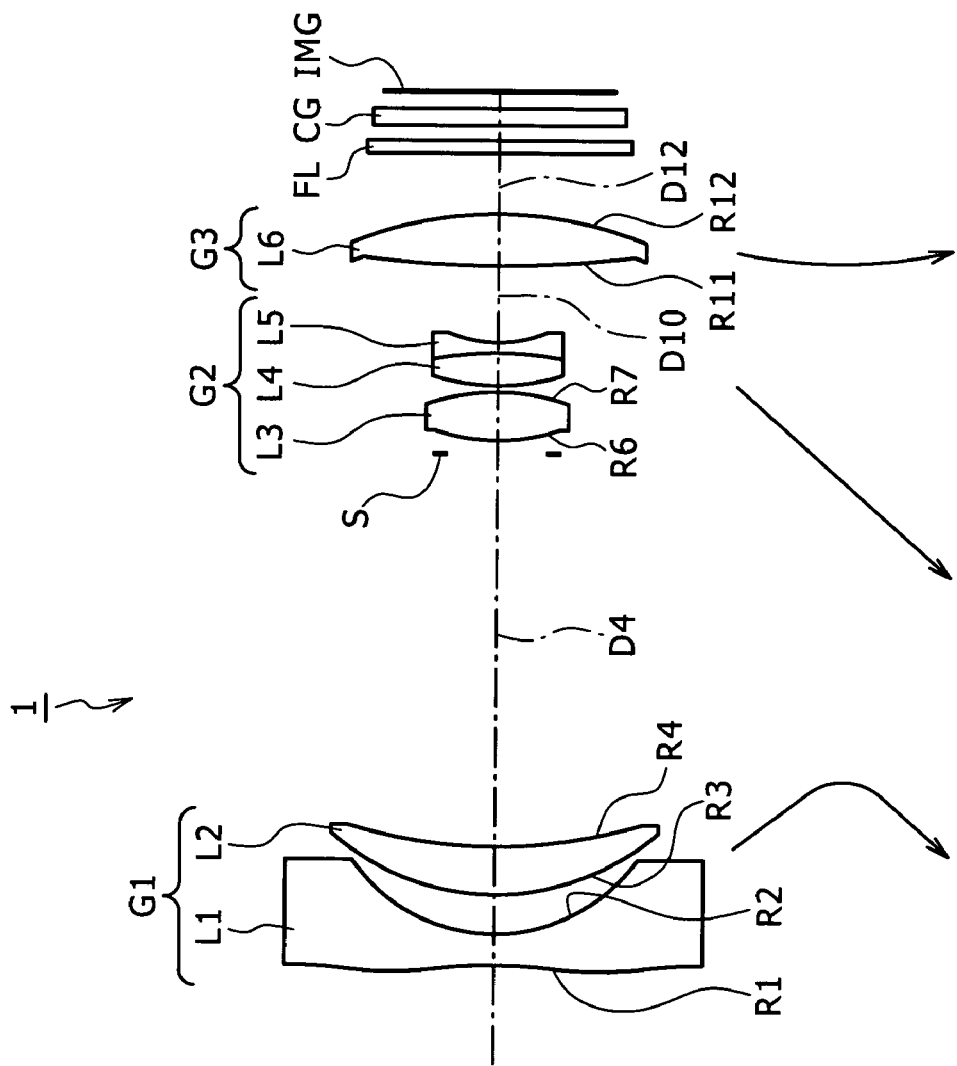
FIG. 1 shows the best mode for carrying out an image pickup device and a zoom lens according to the present invention together with FIGS. 2 to 33, FIG. 1 being a diagram showing the lens configuration of a first embodiment of the zoom lens according to the present invention.

The best mode for carrying out a zoom lens and an image pickup device according to the present invention will hereinafter be described.

A zoom lens according to an embodiment of the present invention will be described first.

The zoom lens according to the embodiment of the present invention is formed by arranging a first lens group having a negative refractive power, a second lens group having a positive refractive power, and a third lens group having a positive refractive power in order from an object side to an image side.

In the zoom lens, at a time of varying power from a wide-angle end to a telephoto end, the first lens group is moved in a direction of an optical axis and the second lens group is moved to the object side in the direction of the optical axis such that an air interval between the first lens group and the second lens group is decreased and such that an air interval between the second lens group and the third lens group is increased.

The first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Because both surfaces of the first lens as the negative lens of the first lens group are formed as aspheric surfaces as described above, the zoom lens according to the embodiment of the present invention can correct negative distortion aberration and field curvature that occur noticeably at a wide-angle end when an angle of view is widened.

In addition, because both surfaces of the second lens as the positive meniscus lens of the first lens group are formed as aspheric surfaces, distortion aberration and astigmatism at the wide-angle end, which cannot be completely corrected by the first lens, can be corrected in a well-balanced manner. In addition, because both surfaces of the second lens as the positive meniscus lens of the first lens group are formed as aspheric surfaces, spherical aberration at the telephoto end which aberration occurs when a variable power ratio is increased can be corrected favorably.

Thus, because the first lens group is formed by the two lenses and both surfaces of each of the first lens and the second lens are formed as aspheric surfaces, the zoom lens according to the embodiment of the present invention can be reduced in size and ensure high optical performance with a wider angle of view and a higher variable power.

In particular, total length of the zoom lens according to the embodiment of the present invention can be shortened at a time of being collapsed when the zoom lens according to the embodiment of the present invention is applied to a collapsible image pickup device of a type having a lens barrel that extends and contracts.

The zoom lens according to one embodiment of the present invention is desirably formed so as to satisfy the following conditional expression (1).

$$0.40 < |Sgf/Sgr| < 2.10 \tag{1}$$

where Sgf denotes a difference between an amount of sag of a paraxial radius of curvature of a surface on the object side in an effective diameter of the second lens and an amount of sag of an aspheric shape, and Sgr denotes a difference between an amount of sag of a paraxial radius of curvature of a surface on the image side in the effective diameter of the second lens and an amount of sag of an aspheric shape.

Incidentally, the sign of "Sgf" and "Sgr" is "−" when the surface shape of the paraxial radius of curvature is closer to the image side than the aspheric shape, and is "+" in the case of the opposite relation.

The conditional expression (1) defines a relation of the aspheric shapes formed as both surfaces of the second lens, which is a positive meniscus lens.

When the lower limit value of the conditional expression (1) is exceeded, insufficiency of correction of distortion aberration at the wide-angle end by the aspheric surface as the surface on the object side of the second lens occurs, and the role of correcting the distortion aberration by the aspheric surface as the surface on the image side of the second lens is increased, so that insufficiency of correction of field curvature in the surface on the image side occurs.

On the other hand, when the upper limit value of the conditional expression (1) is exceeded, distortion aberration and field curvature caused in the second lens are corrected excessively, and aberration correction in the first lens group becomes difficult. In addition, the decentration sensitivity of the surface on the object side and the surface on the image side of the second lens is increased, and further the decentration sensitivity of the second lens with respect to the entire lens system is increased, so that difficulty in manufacturing the zoom lens occurs.

Thus, when the zoom lens satisfies the conditional expression (1), it is possible to favorably perform aberration correction, especially correction of the distortion aberration and the field curvature, and avoid the manufacturing difficulty by a decrease in decentration sensitivity.

Incidentally, in the zoom lens according to the embodiment of the present invention, it is more desirable that the numerical range of the conditional expression (1) be set to the range of the following conditional expression (1)'.

$$0.60 < |Sgf/Sgr| < 1.95 \tag{1'}$$

The zoom lens according to one embodiment of the present invention is desirably formed so as to satisfy the following conditional expression (2) and the following conditional expression (3).

$$1.00 < |f12/f1| < 2.00 \tag{2}$$

$$1.00 < t1/fw < 1.60 \tag{3}$$

where f12 denotes the focal length of the second lens, f1 denotes the focal length of the first lens group, t1 denotes the thickness on the optical axis of the first lens group, and fw denotes a focal length at the wide-angle end in the entire lens system.

The conditional expression (2) defines a ratio between the focal length of the second lens of the first lens group and the focal length of the first lens group.

When the lower limit value of the conditional expression (2) is exceeded, the focal length of the second lens becomes too short, and therefore the thickness of the second lens needs to be increased, which hinders size reduction. In addition, amounts of various aberrations occurring in the second lens are increased, and decentration sensitivity is raised, so that mass productivity is impaired.

On the other hand, when the upper limit value of the conditional expression (2) is exceeded, the focal length of the second lens becomes too long, and therefore aberration correction, especially correction of field curvature at the wide-angle end becomes difficult.

Thus, when the zoom lens satisfies the conditional expression (2), it is possible to improve mass productivity by a decrease in decentration sensitivity, and perform favorable aberration correction, especially favorable correction of field curvature at the wide-angle end.

The conditional expression (3) defines the thickness on the optical axis of the first lens group in relation to the focal length at the wide-angle end.

When the lower limit value of the conditional expression (3) is exceeded, amounts of various off-axis aberrations become too large, and correction of astigmatism at the wide-angle end, in particular, becomes difficult, so that optical performance is impaired.

On the other hand, when the upper limit value of the conditional expression (3) is exceeded, the thickness of the first lens group is increased, which hinders reduction in size of the entire lens system.

Thus, when the zoom lens satisfies the conditional expression (3), it is possible to improve optical performance due to favorable correction of astigmatism, and miniaturize the entire lens system.

In addition, by satisfying the conditional expression (2) and the conditional expression (3), it is possible to achieve miniaturization due to the shortening of total optical length, and ensure high optical performance.

Incidentally, in the present invention, it is more desirable that the numerical ranges of the conditional expressions (2) and the conditional expression (3) be set to the ranges of the following conditional expression (2)' and the following conditional expression (3)'.

$$1.30 < |f12/f1| < 1.80 \quad (2)'$$

$$1.05 < t1/fw < 1.50 \quad (3)'$$

The zoom lens according to one embodiment of the present invention is desirably formed so as to satisfy the following conditional expression (4) and the following conditional expression (5).

$$N12 > 1.90 \quad (4)$$

$$v12 < 25 \quad (5)$$

where N12 denotes the index of refraction at a d-line of the second lens, and v12 denotes the Abbe number at the d-line of the second lens.

The conditional expression (4) and the conditional expression (5) define the index of refraction and the Abbe number of the second lens forming the first lens group.

When the range of the conditional expression (4) is exceeded, the curvature of the second lens needs to be increased, and optical performance is degraded due to difficulty in correcting field curvature at the wide-angle end. In addition, it becomes difficult to secure edge thickness, which is the thickness in the direction of the optical axis of an outermost edge of the lens, and therefore increase manufacturing difficulty.

Thus, when the zoom lens satisfies the conditional expression (4), it is possible to improve the optical performance, and avoid the manufacturing difficulty.

When the range of the conditional expression (5) is exceeded, it becomes difficult to correct chromatic aberration occurring in the first lens group, thus inviting degradation in optical performance.

Thus, when the zoom lens satisfies the conditional expression (5), the optical performance can be improved.

In the zoom lens according to one embodiment of the present invention, the second lens group is desirably formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

By thus forming the second lens group, the second lens group is formed by a small number of lenses, so that the total length can be shortened. In addition, the front principal point of the second lens group can be made closer to the object side, so that the total optical length can be shortened. Further, by forming the surface of the second lens group which surface is closest to the object side by an aspheric surface, spherical aberration and coma aberration can be corrected favorably.

Incidentally, the zoom lens according to the embodiment of the present invention can shift an image by moving (shifting) one lens group of the first to third lens groups or a part of one lens group in a direction substantially perpendicular to the optical axis. The zoom lens can be made to function also as an antivibration optical system by thus moving a lens group or a part of the lens group in the direction substantially perpendicular to the optical axis, and combining the zoom lens with a detecting system for detecting an image blur, a driving system for shifting each lens group, and a controlling system for providing an amount of shift to the driving system on the basis of the output of the detecting system. In particular, the zoom lens according to the embodiment of the present invention can shift an image with a small variation in aberration by shifting the whole of the second lens group in the direction substantially perpendicular to the optical axis.

The zoom lens according to the embodiment of the present invention desirably performs focusing by moving the first lens group or the third lens group in the direction of the optical axis. Using the third lens group as a lens group for focusing, in particular, makes it easy to avoid interference with a driving system for driving and controlling a shutter unit and an iris unit and with an antivibration driving system for shifting a lens group, and makes it possible to achieve miniaturization.

A concrete embodiment of the zoom lens according to the present invention and numerical embodiments in which concrete numerical values are applied to the embodiment will next be described with reference to drawings and tables.

Incidentally, the meanings of symbols shown in the tables and description in the following and the like are as follows.

"Si" is the surface number of an ith surface numbered from the object side to the image side, "Ri" is the radius of curvature of the ith surface, "Di" is a surface interval on the axis between the ith surface and an (i+1)th surface, "Nn" is the index of refraction at the d-line (wavelength of 587.6 nm) of a material forming an nth lens, and "vn" is the Abbe number at the d-line of the material forming the nth lens. In regard to the radius of curvature, "ASP" denotes that the surface is an aspheric surface, and "INF" denotes that the curvature of the surface is infinite.

Lenses used in each numerical embodiment include lenses whose lens surface is formed as an aspheric surface. Letting "x" be a distance in the direction of the optical axis from the vertex of the lens surface, "y" be a height in a direction perpendicular to the optical axis, "c" be a paraxial curvature (reciprocal of a radius of curvature) at the vertex of the lens, "K" be a conic constant, and "An" be an n-th order aspheric coefficient, the aspheric shape is defined by the following Equation 1.

$$x = \frac{y^2 \cdot c^2}{1 + \{1 - (1+K) \cdot y^2 \cdot c^2\}^{1/2}} + \Sigma An \cdot Yn \quad \text{[Equation 1]}$$

A first to an eighth embodiment of the present invention will hereinafter be described. Zoom lenses according to the first to eighth embodiments are each formed by arranging a first lens group having a negative refractive power, a second lens group having a positive refractive power, and a third lens group having a positive refractive power in order from an object side to an image side. In addition, in each of the zoom lenses according to the first to eighth embodiments, at a time of varying power from a wide-angle end to a telephoto end, the first lens group is moved, and the second lens group is moved to the object side such that an air interval between the first lens group and the second lens group is decreased and such that an air interval between the second lens group and the third lens group is increased.

FIG. 1 is a diagram showing the lens configuration of a zoom lens 1 according to a first embodiment of the present invention.

The zoom lens 1 according to the first embodiment has six lenses, as shown in FIG. 1.

The zoom lens 1 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 1 shows lens data of a first numerical embodiment in which concrete numerical values are applied to the zoom lens 1 according to the first embodiment.

TABLE 1

| Si | Ri | Di | Nn | νn |
|---|---|---|---|---|
| 1 | −21.176 (ASP) | 1.100 | 1.85135 | 40.1 |
| 2 | 6.371 (ASP) | 1.591 | | |
| 3 | 7.316 (ASP) | 1.812 | 2.00170 | 20.6 |
| 4 | 13.417 (ASP) | D4 | | |
| 5 | DIAPHRAGM | 0.500 | | |
| 6 | 5.619 (ASP) | 1.934 | 1.62263 | 58.2 |
| 7 | −9.097 (ASP) | 0.166 | | |
| 8 | 9.907 | 1.200 | 1.83481 | 42.7 |
| 9 | −22.955 | 0.400 | 1.72825 | 28.3 |
| 10 | 3.365 | D10 | | |
| 11 | 72.285 (ASP) | 1.809 | 1.69350 | 53.2 |
| 12 | −11.429 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 1, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the first numerical embodiment are shown in Table 2 together with the conic constant K.

Incidentally, "E-i" in Table 2 and each table showing aspheric coefficients to be described later denotes an exponential expression having a base of 10, that is, "$10^{-i}$." For example, "0.12345E-05" denotes "$0.12345 \times 10^{-5}$."

TABLE 2

| Si | K | A4 | A6 | A8 | A10 |
|---|---|---|---|---|---|
| 1 | 0.00000E+00 | 1.30795E−03 | −2.74563E−05 | 2.83298E−07 | −1.27146E−09 |
| 2 | 0.00000E+00 | −4.02309E−04 | 9.76180E−05 | −2.97293E−06 | 1.46066E−08 |
| 3 | 0.00000E+00 | −1.44319E−03 | 5.76486E−05 | −1.55041E−06 | 1.95053E−08 |
| 4 | 0.00000E+00 | −7.41809E−04 | 2.34737E−05 | −7.37123E−07 | 1.41276E−08 |
| 6 | −2.57694E+00 | −7.01226E−04 | −2.32219E−04 | −6.79299E−07 | −4.17015E−06 |
| 7 | 4.18532E+00 | −3.76244E−04 | −1.41281E−04 | −1.88899E−05 | −1.03773E−07 |
| 11 | 0.00000E+00 | 6.20887E−04 | −5.12367E−05 | 2.76052E−06 | −6.57107E−08 |
| 12 | 0.00000E+00 | 1.35562E−03 | −8.32716E−05 | 3.75398E−06 | −7.77118E−08 |

In the zoom lens 1, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=7.95), and a telephoto end state (focal length f=17.47) of each surface interval in the first numerical embodiment are shown in Table 3 together with an F-number Fno and a half angle of view ω.

TABLE 3

| f | 3.71 | 7.95 | 17.47 |
|---|---|---|---|
| Fno | 2.84 | 4.09 | 6.08 |
| ω | 47.82 | 26.11 | 12.58 |
| D4 | 15.085 | 5.700 | 1.300 |
| D10 | 3.035 | 8.621 | 20.568 |
| D12 | 2.490 | 2.394 | 1.900 |

Figure 2:
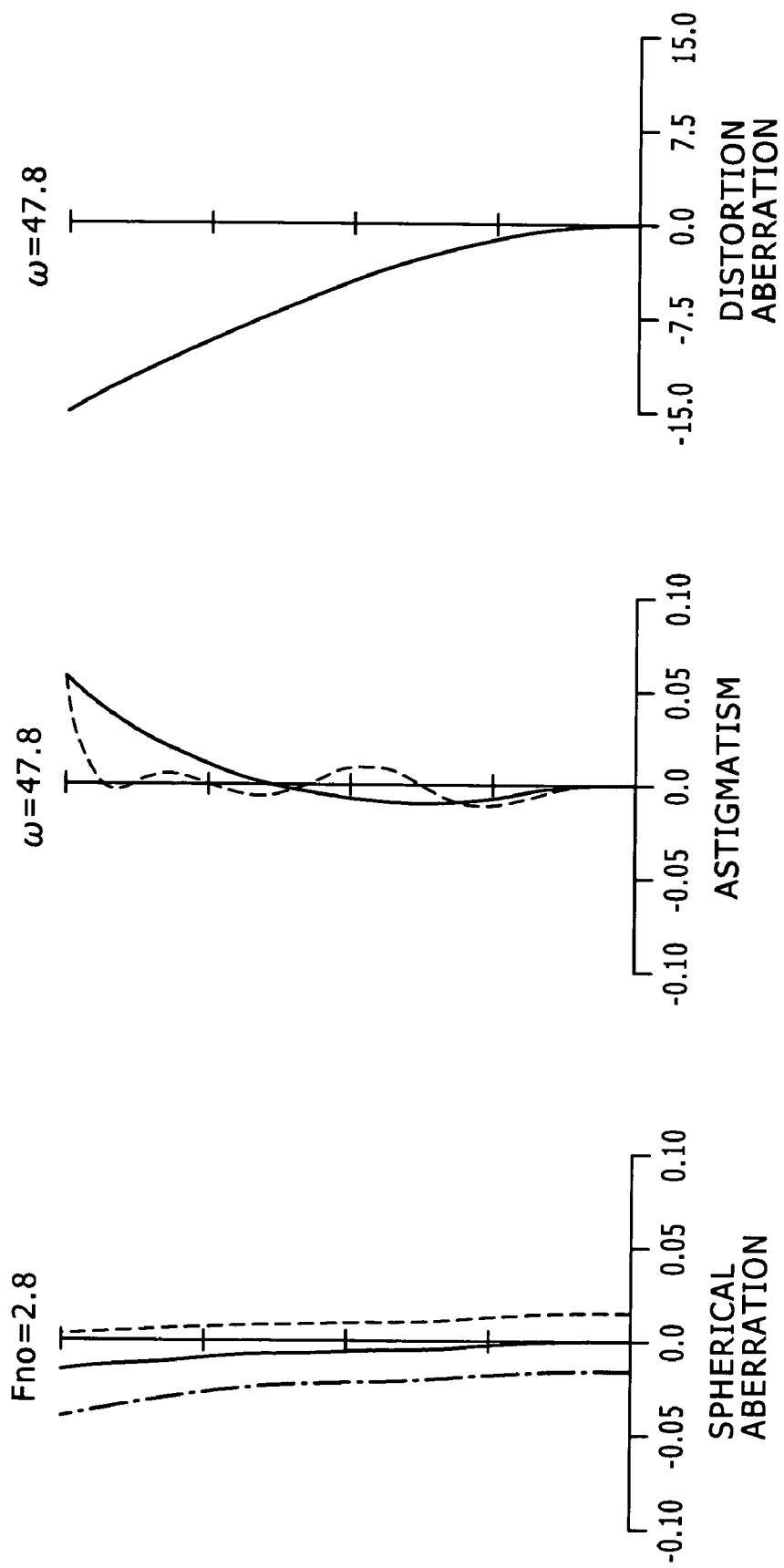
FIG. 2 is a diagram showing aberrations of a numerical embodiment in which concrete numerical values are applied to the first embodiment together with FIG. 3 and FIG. 4, FIG. 2 being a diagram showing spherical aberration, astigmatism, and distortion aberration in a wide-angle end state.
Figure 3:
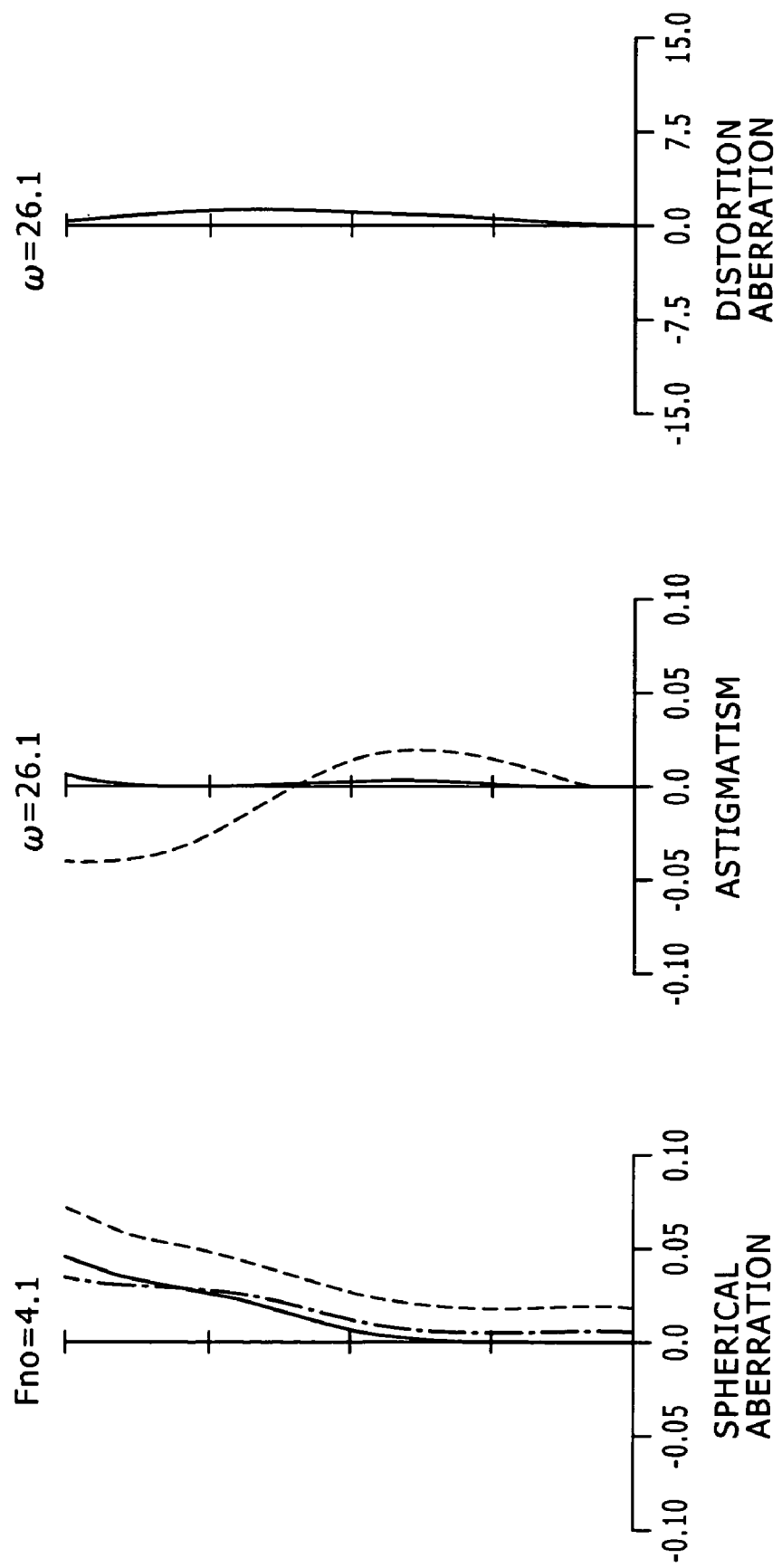
FIG. 3 is a diagram showing spherical aberration, astigmatism, and distortion aberration in an intermediate focal length state.
Figure 4:
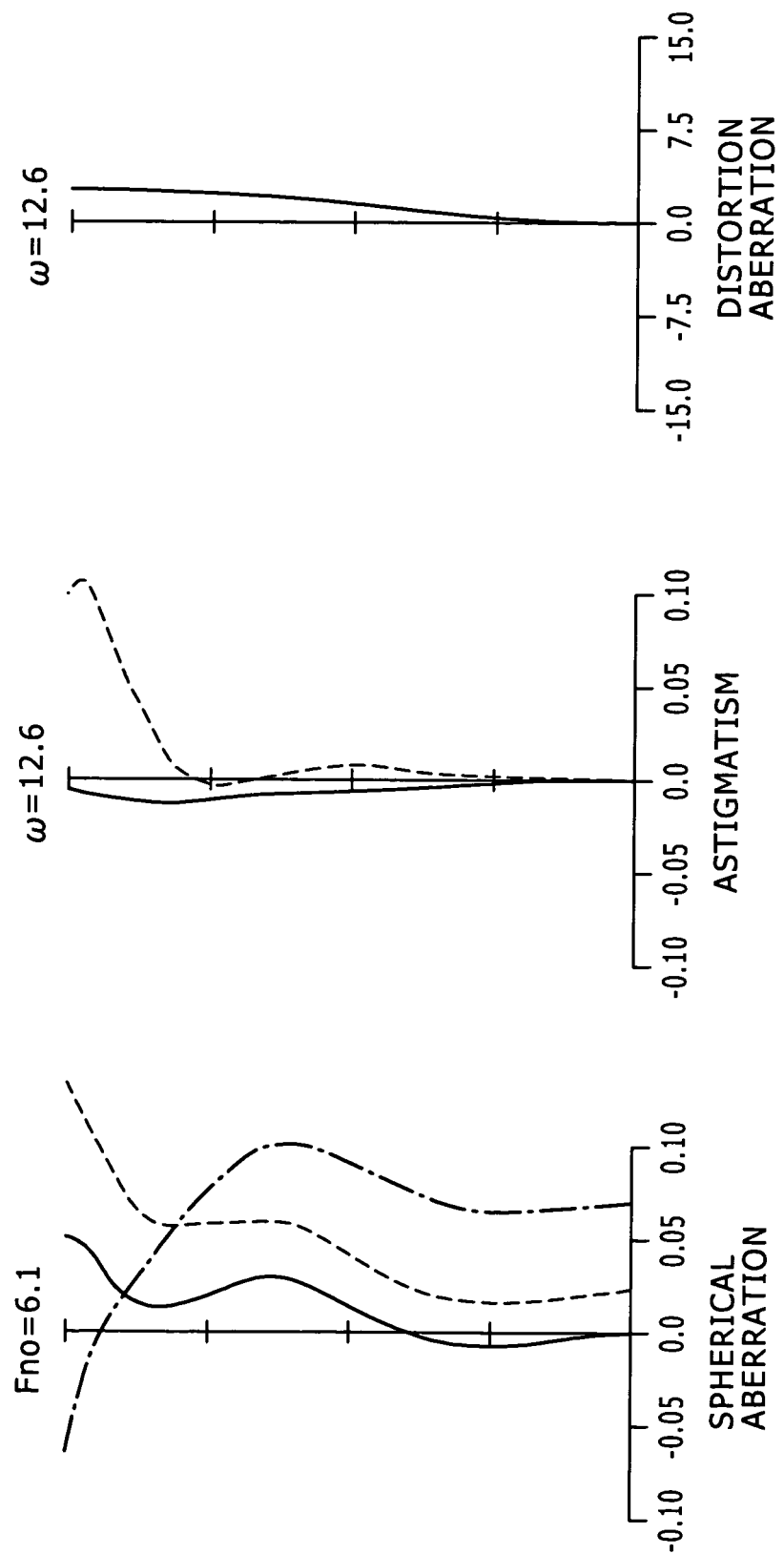
FIG. 4 is a diagram showing spherical aberration, astigmatism, and distortion aberration in a telephoto end state.

FIGS. 2 to 4 are diagrams of various aberrations in an infinity in-focus state in the first numerical embodiment. FIG. 2 is a diagram of various aberrations in the wide-angle end state (focal length f=3.71). FIG. 3 is a diagram of various aberrations in the intermediate focal length state (focal length f=7.95). FIG. 4 is a diagram of various aberrations in the telephoto end state (focal length f=17.47).

In the diagrams of spherical aberrations shown in FIGS. 2 to 4, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 2 to 4, a value in a sagittal image surface is shown by a solid line, and a value in a meridional image surface is shown by a broken line.

It is clear from each aberration diagram that the first numerical embodiment favorably corrects various aberrations and has excellent image forming performance.

Figure 5:
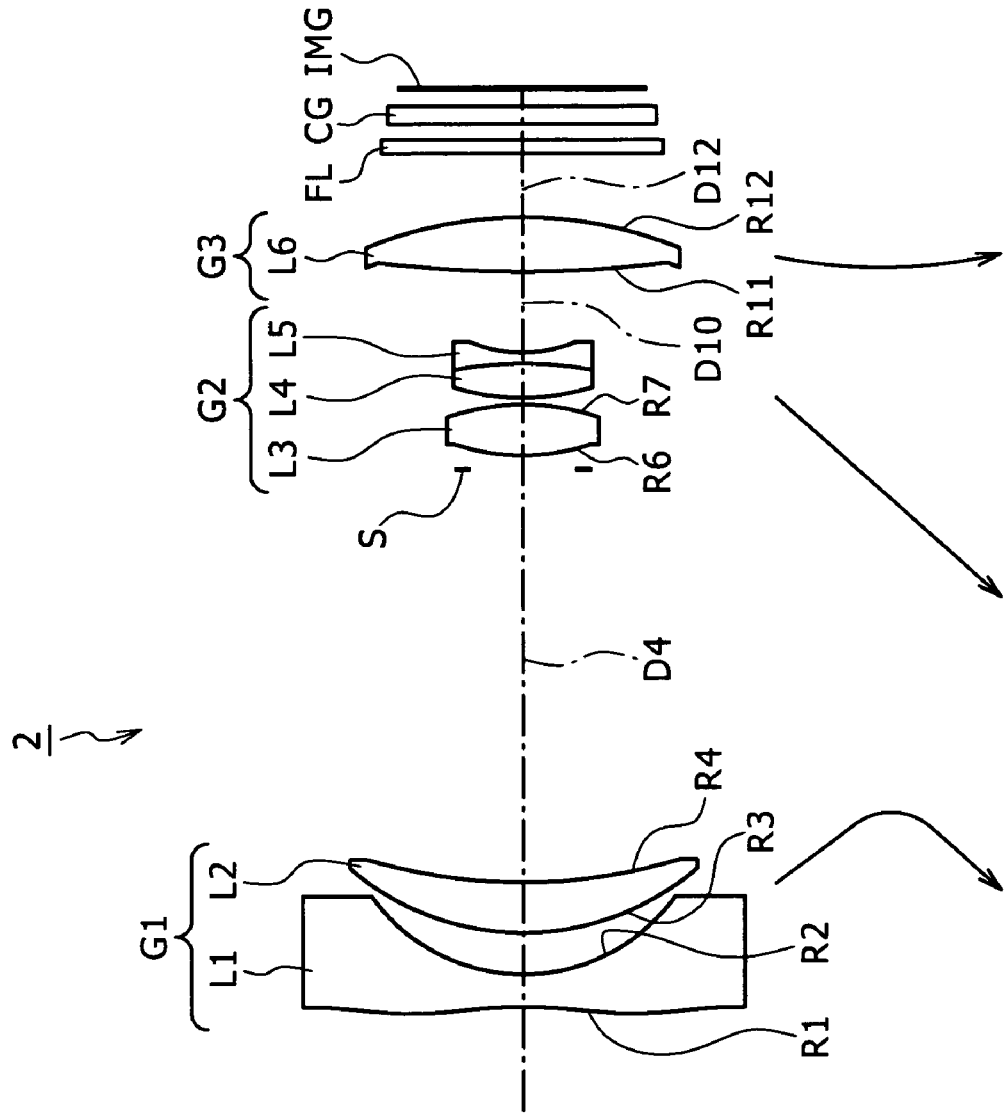
FIG. 5 is a diagram showing the lens configuration of a second embodiment of the zoom lens according to the present invention.

FIG. 5 is a diagram showing the lens configuration of a zoom lens 2 according to a second embodiment of the present invention.

The zoom lens 2 according to the second embodiment has six lenses, as shown in FIG. 5.

The zoom lens 2 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 4 shows lens data of a second numerical embodiment in which concrete numerical values are applied to the zoom lens 2 according to the second embodiment.

TABLE 4

| Si | Ri | Di | Nn | νn |
|---|---|---|---|---|
| 1 | −26.914 (ASP) | 1.050 | 1.85135 | 40.1 |
| 2 | 6.496 (ASP) | 1.680 | | |
| 3 | 7.158 (ASP) | 1.650 | 2.00178 | 19.3 |
| 4 | 11.811 (ASP) | D4 | | |
| 5 | DIAPHRAGM | 0.500 | | |
| 6 | 5.486 (ASP) | 1.900 | 1.61881 | 63.9 |
| 7 | −10.012 (ASP) | 0.153 | | |
| 8 | 8.894 | 1.200 | 1.83481 | 42.7 |
| 9 | 82.637 | 0.400 | 1.74077 | 27.8 |
| 10 | 3.351 | D10 | | |
| 11 | 43.343 (ASP) | 1.850 | 1.69350 | 53.2 |
| 12 | −12.500 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 2, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the second numerical embodiment are shown in Table 5 together with the conic constant K.

TABLE 5

| Si | K | A4 | A6 | A8 | A10 |
|---|---|---|---|---|---|
| 1 | 0.00000E+00 | 1.25759E−03 | −2.74004E−05 | 2.79017E−07 | −1.21596E−09 |
| 2 | 0.00000E+00 | −3.71139E−04 | 9.08870E−05 | −2.72690E−06 | 1.16470E−08 |
| 3 | 0.00000E+00 | −1.64768E−03 | 5.88422E−05 | −1.54023E−06 | 1.77084E−08 |
| 4 | 0.00000E+00 | −1.02198E−03 | 3.33332E−05 | −1.12716E−06 | 2.02348E−08 |
| 6 | −2.36381E+00 | −5.30341E−04 | −1.85814E−04 | −2.90985E−06 | −3.43982E−06 |
| 7 | 4.23737E+00 | −5.00643E−04 | −1.11059E−04 | −2.13554E−05 | −3.30322E−09 |
| 11 | 0.00000E+00 | 5.38581E−04 | −4.36449E−05 | 2.47117E−06 | −6.54183E−08 |
| 12 | 0.00000E+00 | 1.21880E−03 | −6.87382E−05 | 3.02394E−06 | −6.85585E−08 |

In the zoom lens 2, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=7.99), and a telephoto end state (focal length f=17.47) of each surface interval in the second numerical embodiment are shown in Table 6 together with an F-number Fno and a half angle of view ω.

TABLE 6

| f | 3.71 | 7.99 | 17.47 |
|---|---|---|---|
| Fno | 2.87 | 4.14 | 6.10 |
| ω | 47.82 | 26.02 | 12.58 |
| D4 | 15.979 | 6.072 | 1.600 |
| D10 | 3.036 | 8.561 | 20.597 |
| D12 | 2.459 | 2.465 | 1.900 |

Figure 6:
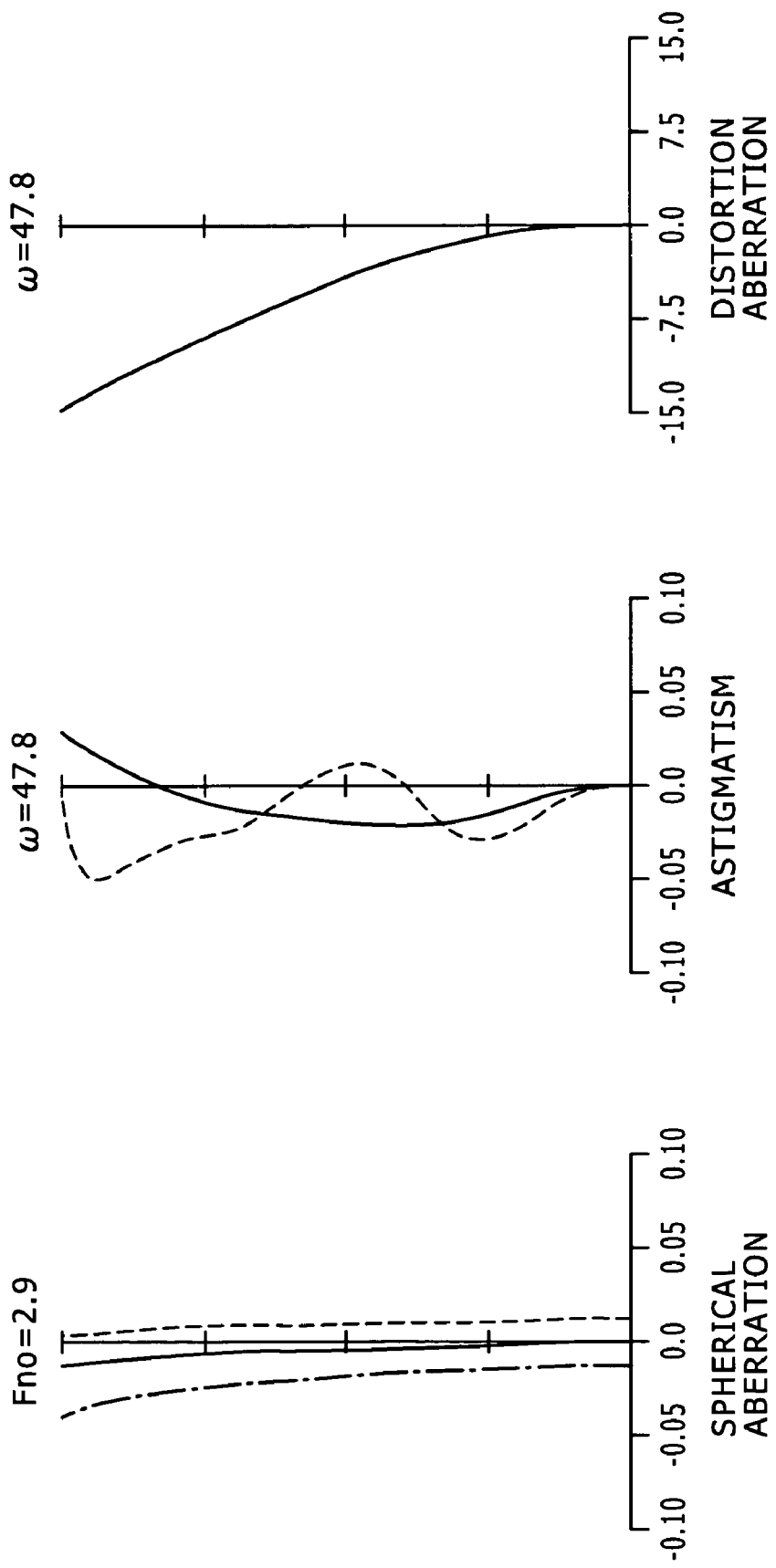
FIG. 6 is a diagram showing aberrations of a numerical embodiment in which concrete numerical values are applied to the second embodiment together with FIG. 7 and FIG. 8, FIG. 6 being a diagram showing spherical aberration, astigmatism, and distortion aberration in a wide-angle end state.
Figure 7:
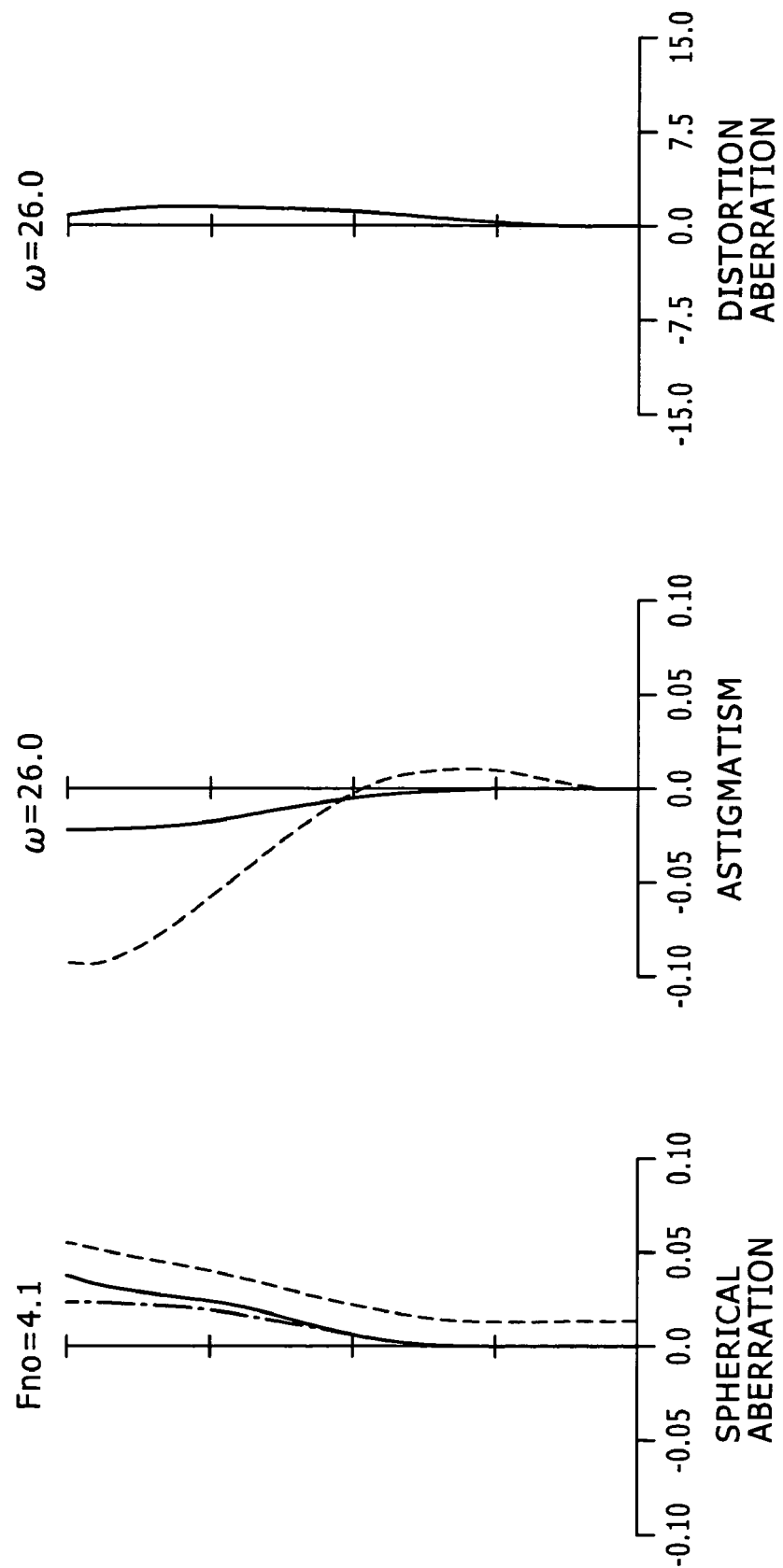
FIG. 7 is a diagram showing spherical aberration, astigmatism, and distortion aberration in an intermediate focal length state.
Figure 8:
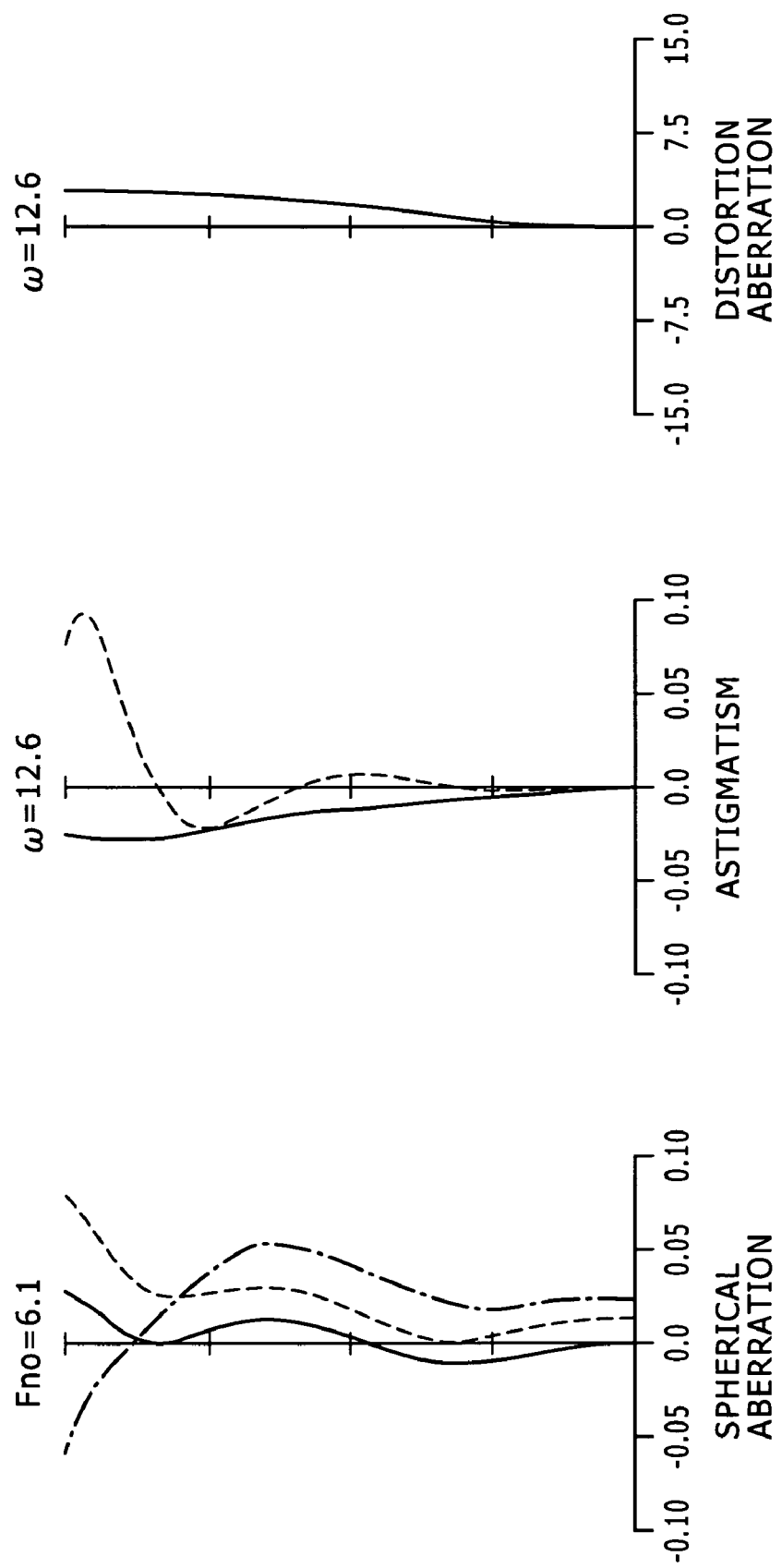
FIG. 8 is a diagram showing spherical aberration, astigmatism, and distortion aberration in a telephoto end state.

FIGS. 6 to 8 are diagrams of various aberrations in an infinity in-focus state in the second numerical embodiment. FIG. 6 is a diagram of various aberrations in the wide-angle end state (focal length f=3.71). FIG. 7 is a diagram of various aberrations in the intermediate focal length state (focal length f=7.99). FIG. 8 is a diagram of various aberrations in the telephoto end state (focal length f=17.47).

In the diagrams of spherical aberrations shown in FIGS. 6 to 8, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 6 to 8, a value in a sagittal image surface is shown by a solid line, and a value in a meridional image surface is shown by a broken line.

It is clear from each aberration diagram that the second numerical embodiment favorably corrects various aberrations and has excellent image forming performance.

Figure 9:
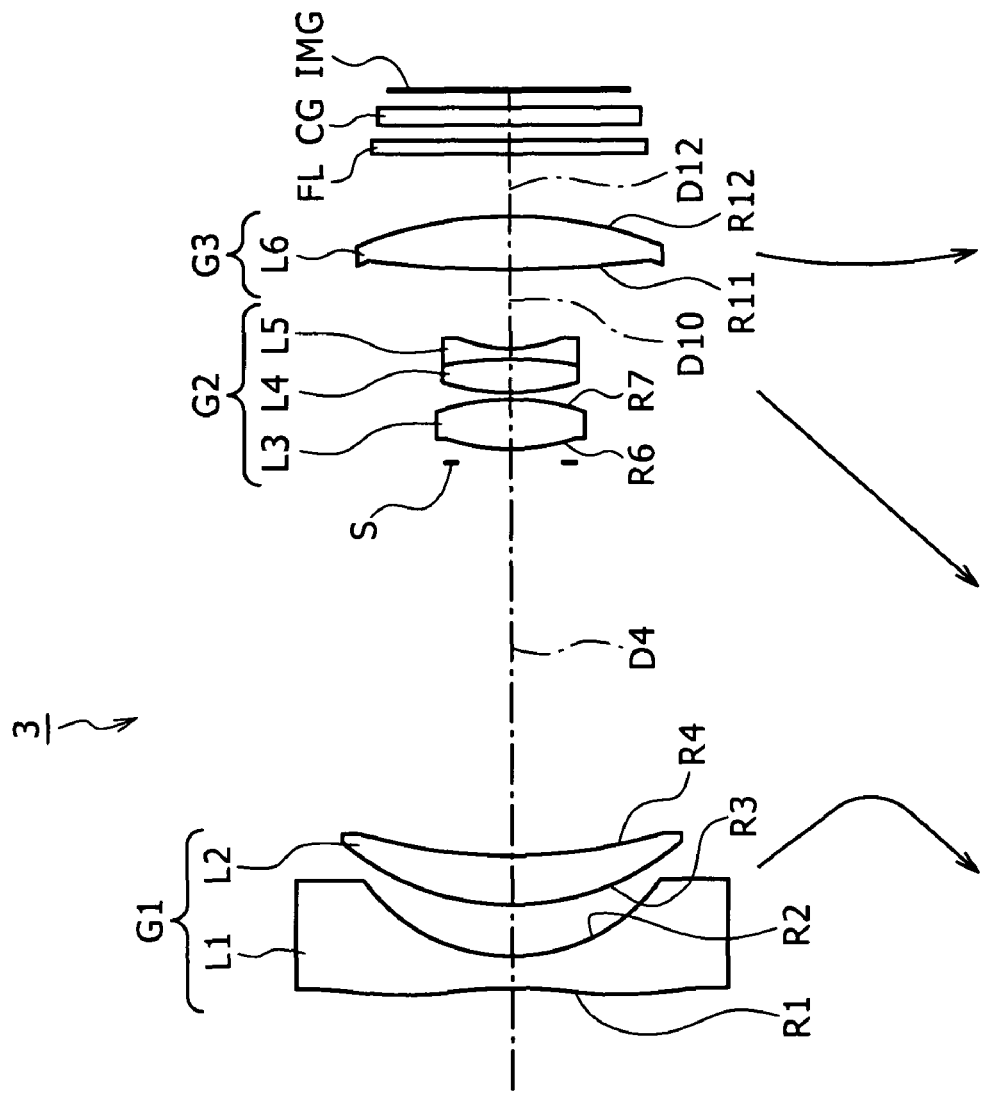
FIG. 9 is a diagram showing the lens configuration of a third embodiment of the zoom lens according to the present invention.

FIG. 9 is a diagram showing the lens configuration of a zoom lens 3 according to a third embodiment of the present invention.

The zoom lens 3 according to the third embodiment has six lenses, as shown in FIG. 9.

The zoom lens 3 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 7 shows lens data of a third numerical embodiment in which concrete numerical values are applied to the zoom lens 3 according to the third embodiment.

TABLE 7

| Si | Ri | Di | Nn | νn |
|---|---|---|---|---|
| 1 | −23.933 (ASP) | 1.050 | 1.85135 | 40.1 |
| 2 | 7.170 (ASP) | 1.948 | | |
| 3 | 7.776 (ASP) | 1.600 | 2.00178 | 19.3 |
| 4 | 12.670 (ASP) | D4 | | |
| 5 | DIAPHRAGM | 0.500 | | |
| 6 | 5.858 (ASP) | 1.900 | 1.69350 | 53.2 |
| 7 | −10.062 (ASP) | 0.100 | | |
| 8 | 10.293 | 1.200 | 1.79450 | 45.4 |
| 9 | −39.628 | 0.400 | 1.75520 | 27.5 |
| 10 | 3.381 | D10 | | |
| 11 | 40.886 (ASP) | 1.850 | 1.62263 | 58.2 |
| 12 | −11.909 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 3, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the third numerical embodiment are shown in Table 8 together with the conic constant K.

TABLE 8

| Si | K | A4 | A6 | A8 | A10 |
|---|---|---|---|---|---|
| 1 | 0.00000E+00 | 1.32881E−03 | −2.89704E−05 | 2.88500E−07 | −1.13864E−09 |
| 2 | 0.00000E+00 | −1.52727E−04 | 8.73476E−05 | −3.14489E−06 | 2.87966E−08 |
| 3 | 0.00000E+00 | −1.58558E−03 | 5.64429E−05 | −1.46018E−06 | 1.84916E−08 |
| 4 | 0.00000E+00 | −1.07349E−03 | 3.48316E−05 | −1.04274E−06 | 1.84035E−08 |
| 6 | −2.78854E+00 | −7.41696E−04 | −2.10556E−04 | −3.47834E−06 | −4.26293E−06 |
| 7 | 5.20688E+00 | −7.61308E−04 | −9.30471E−05 | −3.01112E−05 | 7.58929E−07 |
| 11 | 0.00000E+00 | 1.05137E−03 | −7.59658E−05 | 3.83208E−06 | −9.45318E−08 |
| 12 | 0.00000E+00 | 1.80569E−03 | −9.26685E−05 | 3.62560E−06 | −8.20012E−08 |

In the zoom lens 3, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=7.98), and a telephoto end state (focal length f=17.47) of each surface interval in the third numerical embodiment are shown in Table 9 together with an F-number Fno and a half angle of view ω.

TABLE 9

| f | 3.71 | 7.98 | 17.47 |
|---|---|---|---|
| Fno | 2.88 | 4.11 | 6.11 |
| ω | 47.82 | 26.05 | 12.58 |
| D4 | 16.769 | 6.229 | 1.600 |
| D10 | 2.852 | 8.286 | 20.432 |
| D12 | 2.692 | 2.757 | 1.900 |

Figure 10:
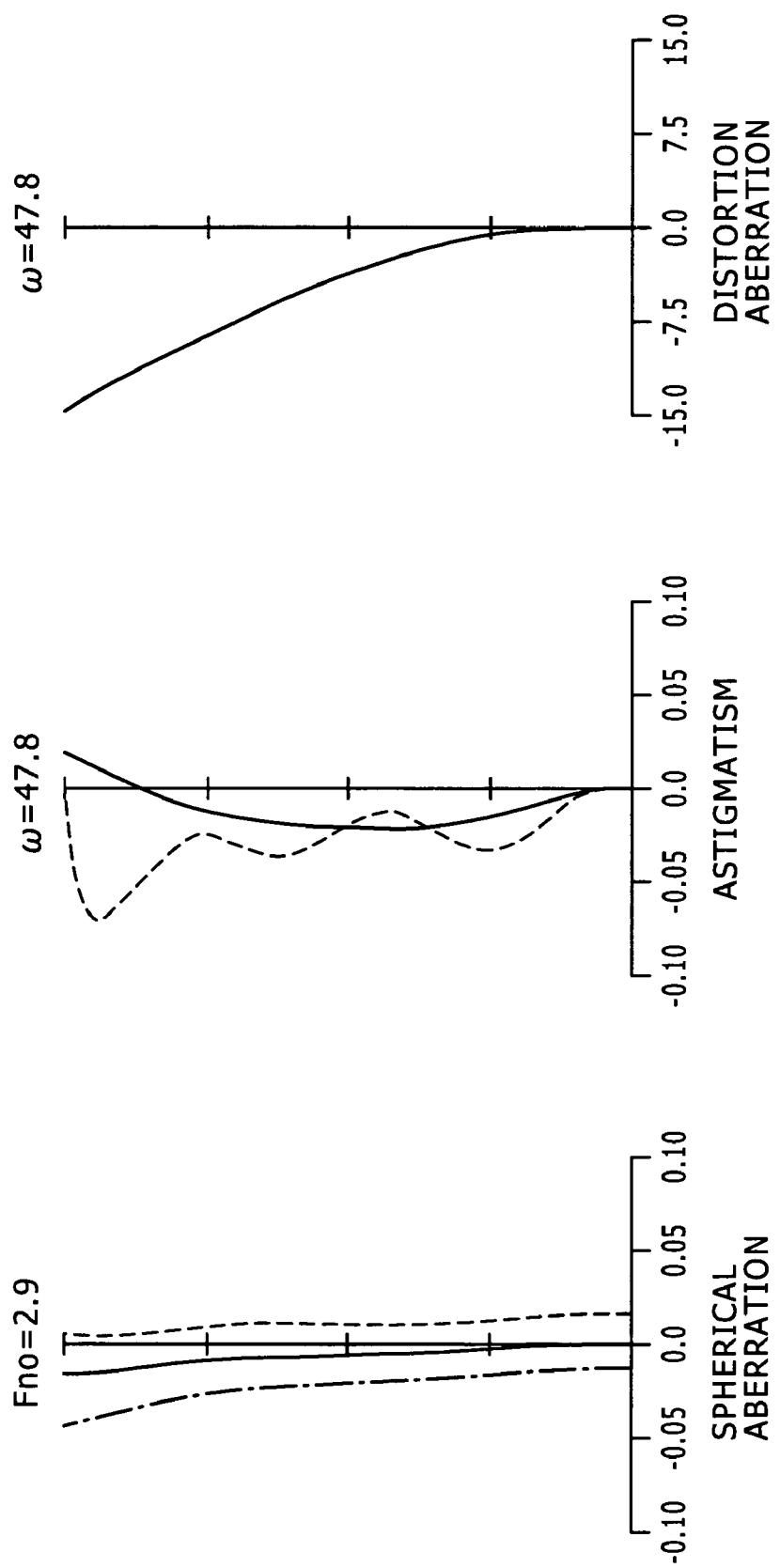
FIG. 10 is a diagram showing aberrations of a numerical embodiment in which concrete numerical values are applied to the third embodiment together with FIG. 11 and FIG. 12, FIG. 10 being a diagram showing spherical aberration, astigmatism, and distortion aberration in a wide-angle end state.
Figure 11:
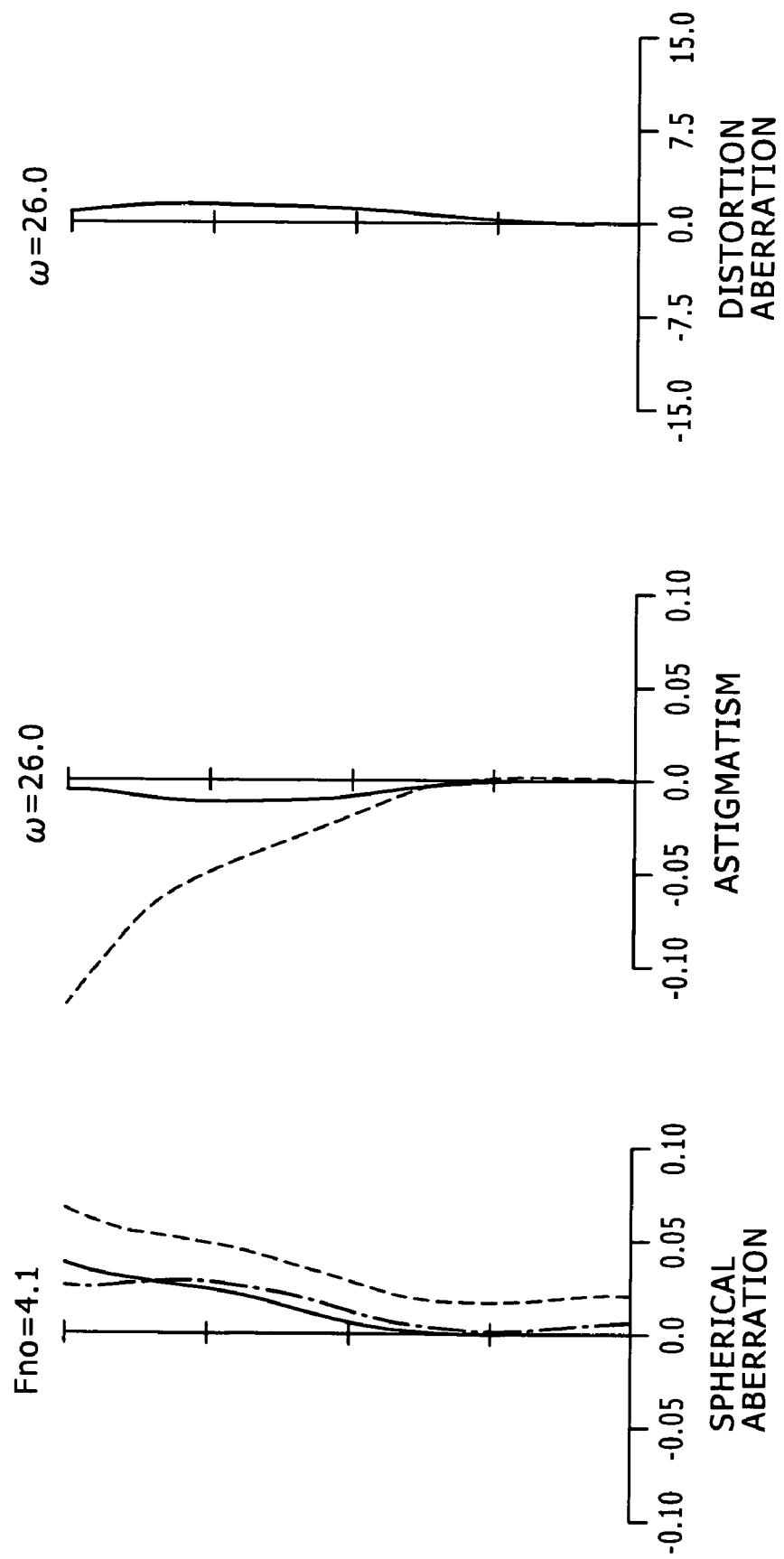
FIG. 11 is a diagram showing spherical aberration, astigmatism, and distortion aberration in an intermediate focal length state.
Figure 12:
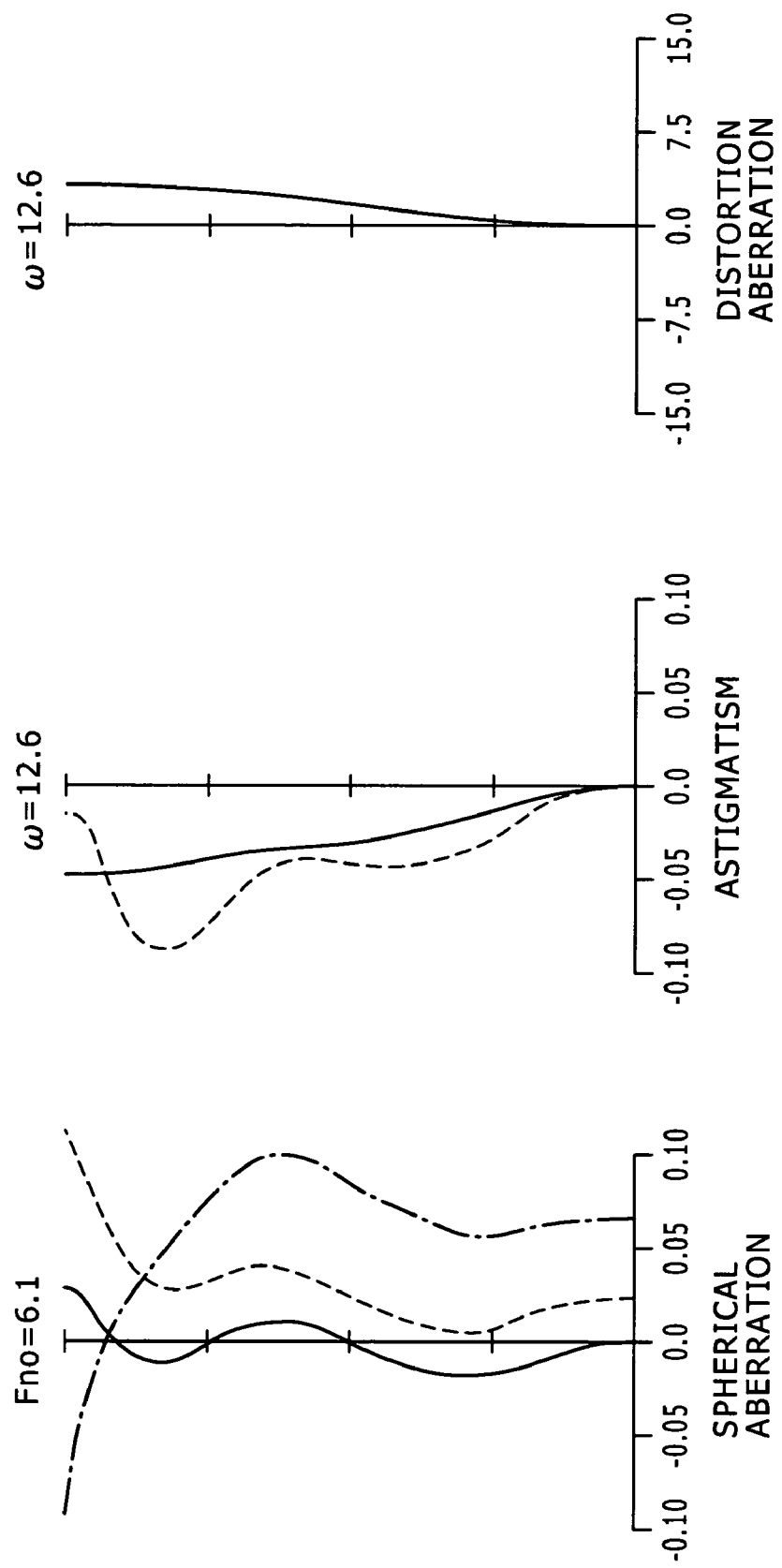
FIG. 12 is a diagram showing spherical aberration, astigmatism, and distortion aberration in a telephoto end state.

FIGS. 10 to 12 are diagrams of various aberrations in an infinity in-focus state in the third numerical embodiment. FIG. 10 is a diagram of various aberrations in the wide-angle end state (focal length f=3.71). FIG. 11 is a diagram of various aberrations in the intermediate focal length state (focal length f=7.98). FIG. 12 is a diagram of various aberrations in the telephoto end state (focal length f=17.47).

In the diagrams of spherical aberrations shown in FIGS. 10 to 12, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 10 to 12, a value in a sagittal image surface is shown by a solid line, and a value in a meridional image surface is shown by a broken line.

It is clear from each aberration diagram that the third numerical embodiment favorably corrects various aberrations and has excellent image forming performance.

Figure 13:
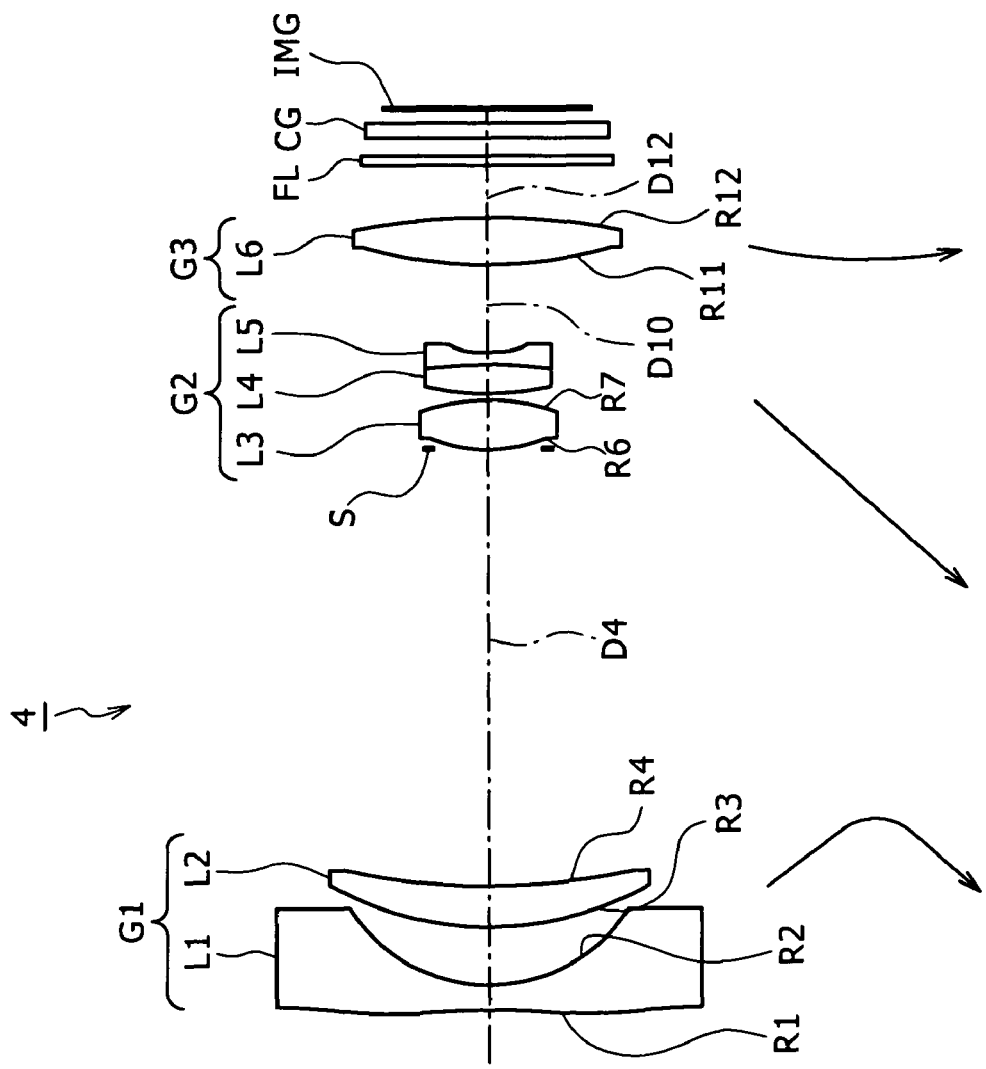
FIG. 13 is a diagram showing the lens configuration of a fourth embodiment of the zoom lens according to the present invention.

FIG. 13 is a diagram showing the lens configuration of a zoom lens 4 according to a fourth embodiment of the present invention.

The zoom lens 4 according to the fourth embodiment has six lenses, as shown in FIG. 13.

The zoom lens 4 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 10 shows lens data of a fourth numerical embodiment in which concrete numerical values are applied to the zoom lens 4 according to the fourth embodiment.

TABLE 10

| Si | Ri | Di | Nn | νn |
|---|---|---|---|---|
| 1 | −22.529 (ASP) | 1.050 | 1.85135 | 40.1 |
| 2 | 7.314 (ASP) | 2.150 | | |
| 3 | 8.670 (ASP) | 1.700 | 2.00178 | 19.3 |
| 4 | 15.400 (ASP) | D4 | | |
| 5 | DIAPHRAGM | 0.000 | | |
| 6 | 5.872 (ASP) | 1.900 | 1.61881 | 63.9 |
| 7 | −9.400 (ASP) | 0.283 | | |
| 8 | 10.353 | 1.200 | 1.83481 | 42.7 |
| 9 | −18.052 | 0.400 | 1.71736 | 29.5 |
| 10 | 3.457 | D10 | | |
| 11 | 28.430 (ASP) | 1.850 | 1.61881 | 63.9 |
| 12 | −13.180 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 4, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the fourth numerical embodiment are shown in Table 11 together with the conic constant K.

TABLE 11

| Si | K | A4 | A6 | A8 | A10 |
|---|---|---|---|---|---|
| 1 | 0.00000E+00 | 1.37791E−03 | −2.89953E−05 | 2.80757E−07 | −1.15140E−09 |
| 2 | 0.00000E+00 | −1.50727E−04 | 9.45084E−05 | −3.25000E−06 | 2.76119E−08 |
| 3 | 0.00000E+00 | −1.46419E−03 | 5.68628E−05 | −1.61015E−06 | 1.86880E−08 |
| 4 | 0.00000E+00 | −9.41080E−04 | 2.86502E−05 | −9.85184E−07 | 1.44594E−08 |
| 6 | 0.00000E+00 | −2.35983E−03 | −1.99992E−04 | −1.10183E−06 | −3.74296E−06 |
| 7 | 0.00000E+00 | −1.09092E−03 | −1.46710E−04 | −1.80861E−05 | −3.06098E−07 |
| 11 | 0.00000E+00 | 1.12662E−03 | −7.58282E−05 | 3.71295E−06 | −8.08267E−08 |
| 12 | 0.00000E+00 | 2.26890E−03 | −1.34052E−04 | 5.66336E−06 | −1.10409E−07 |

In the zoom lens 4, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=7.99), and a telephoto end state (focal length f=17.47) of each surface interval in the fourth numerical embodiment are shown in Table 12 together with an F-number Fno and a half angle of view ω.

TABLE 12

| f   | 3.71   | 7.99  | 17.47  |
|-----|--------|-------|--------|
| Fno | 2.58   | 3.61  | 6.10   |
| ω   | 47.82  | 26.01 | 12.58  |
| D4  | 17.300 | 5.857 | 0.897  |
| D10 | 3.627  | 8.362 | 19.833 |
| D12 | 2.001  | 2.314 | 1.900  |

Figure 14:
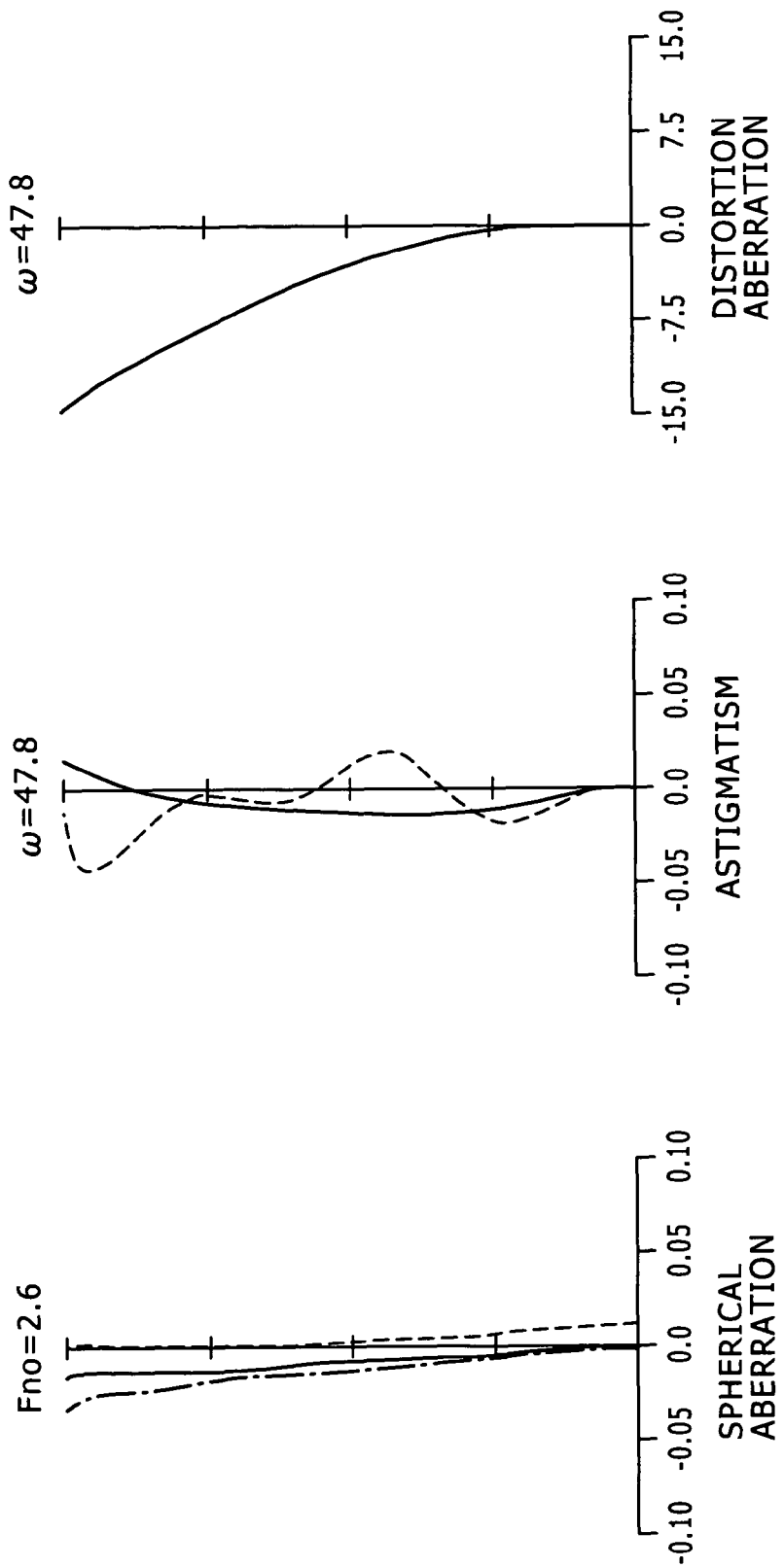
FIG. 14 is a diagram showing aberrations of a numerical embodiment in which concrete numerical values are applied to the fourth embodiment together with FIG. 15 and FIG. 16, FIG. 14 being a diagram showing spherical aberration, astigmatism, and distortion aberration in a wide-angle end state.
Figure 15:
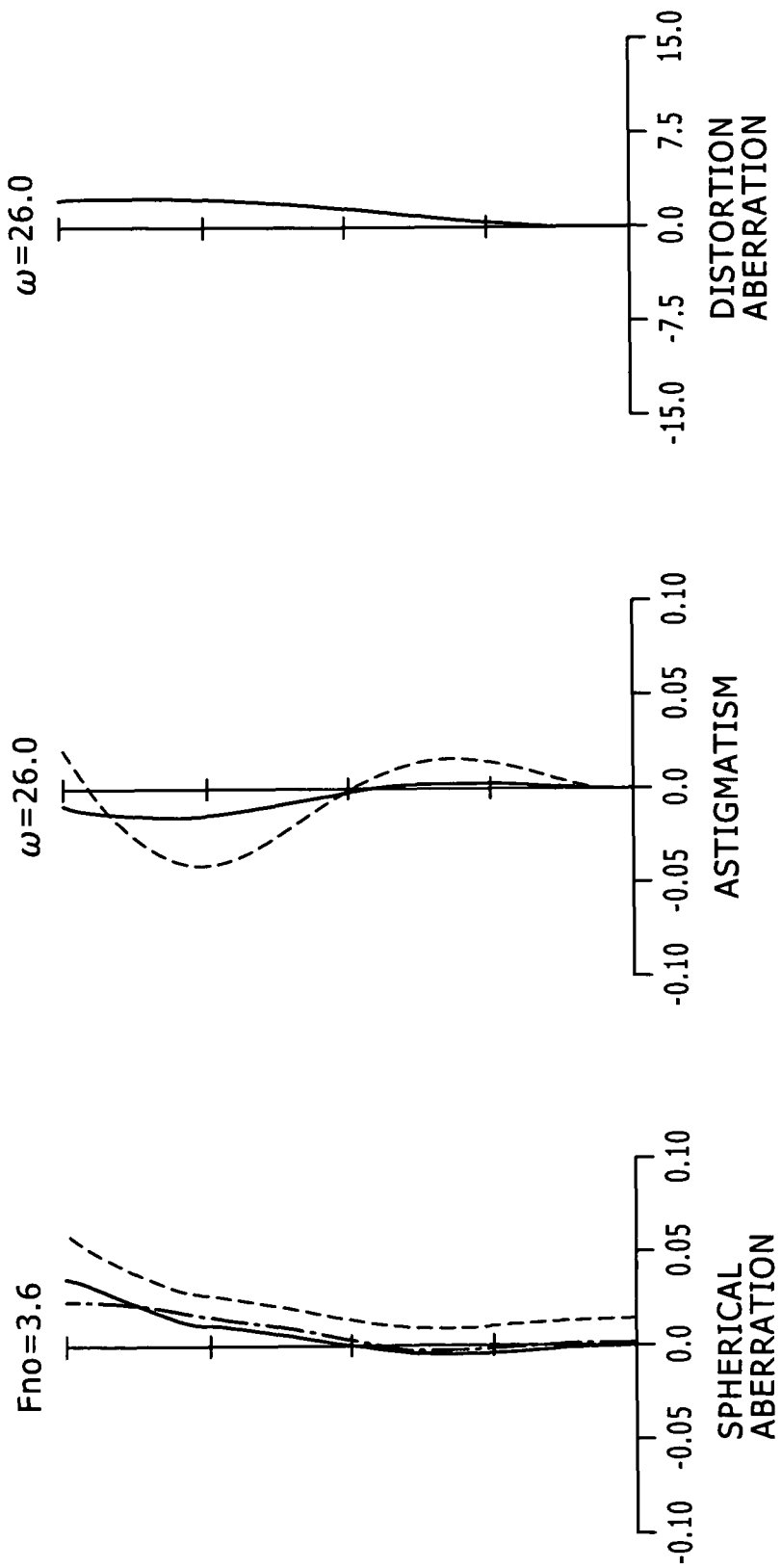
FIG. 15 is a diagram showing spherical aberration, astigmatism, and distortion aberration in an intermediate focal length state.
Figure 16:
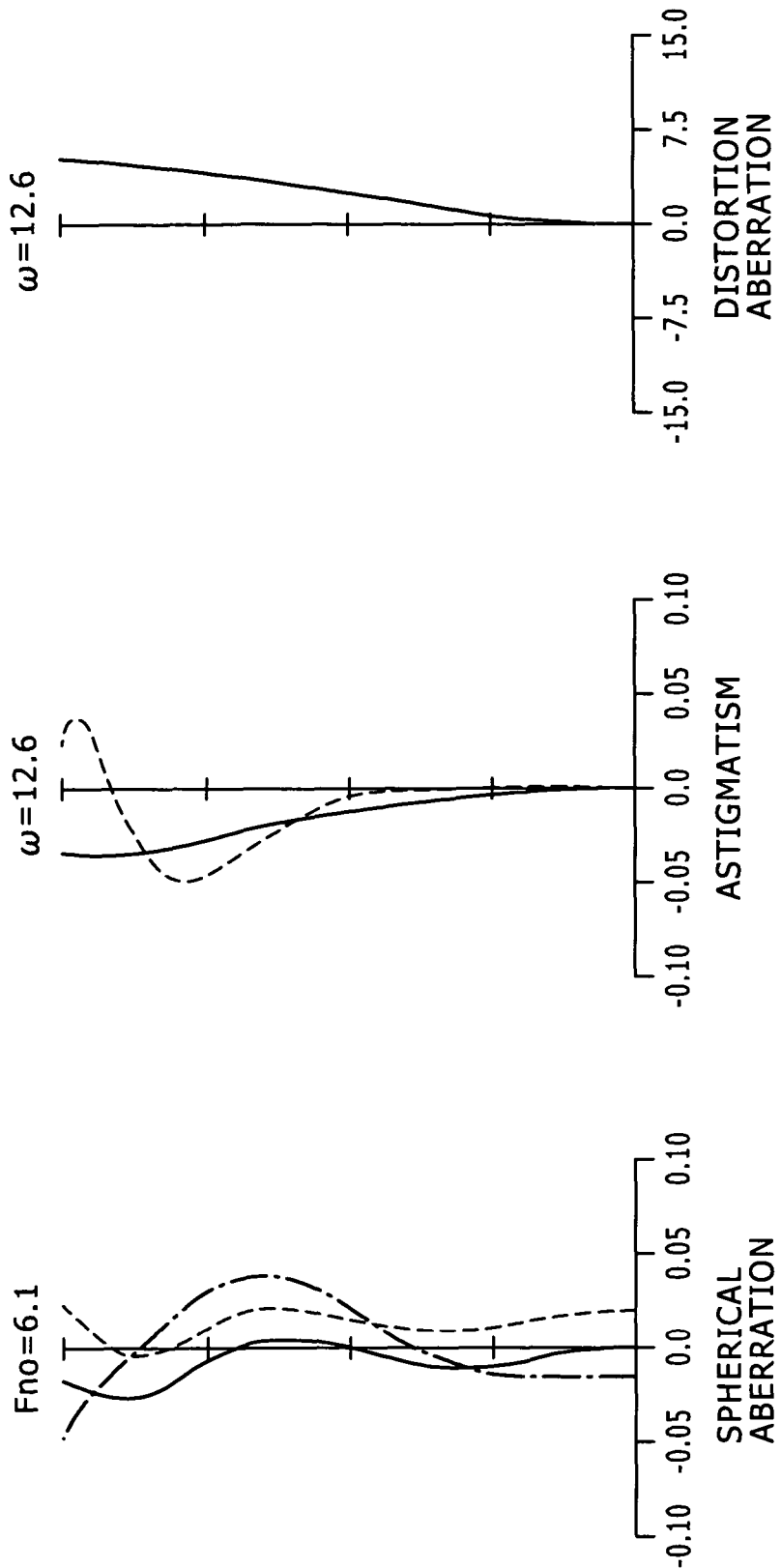
FIG. 16 is a diagram showing spherical aberration, astigmatism, and distortion aberration in a telephoto end state.

FIGS. 14 to 16 are diagrams of various aberrations in an infinity in-focus state in the fourth numerical embodiment. FIG. 14 is a diagram of various aberrations in the wide-angle end state (focal length f=3.71). FIG. 15 is a diagram of various aberrations in the intermediate focal length state (focal length f=7.99). FIG. 16 is a diagram of various aberrations in the telephoto end state (focal length f=17.47).

In the diagrams of spherical aberrations shown in FIGS. 14 to 16, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 14 to 16, a value in a sagittal image surface is shown by a solid line, and a value in a meridional image surface is shown by a broken line.

It is clear from each aberration diagram that the fourth numerical embodiment favorably corrects various aberrations and has excellent image forming performance.

Figure 17:
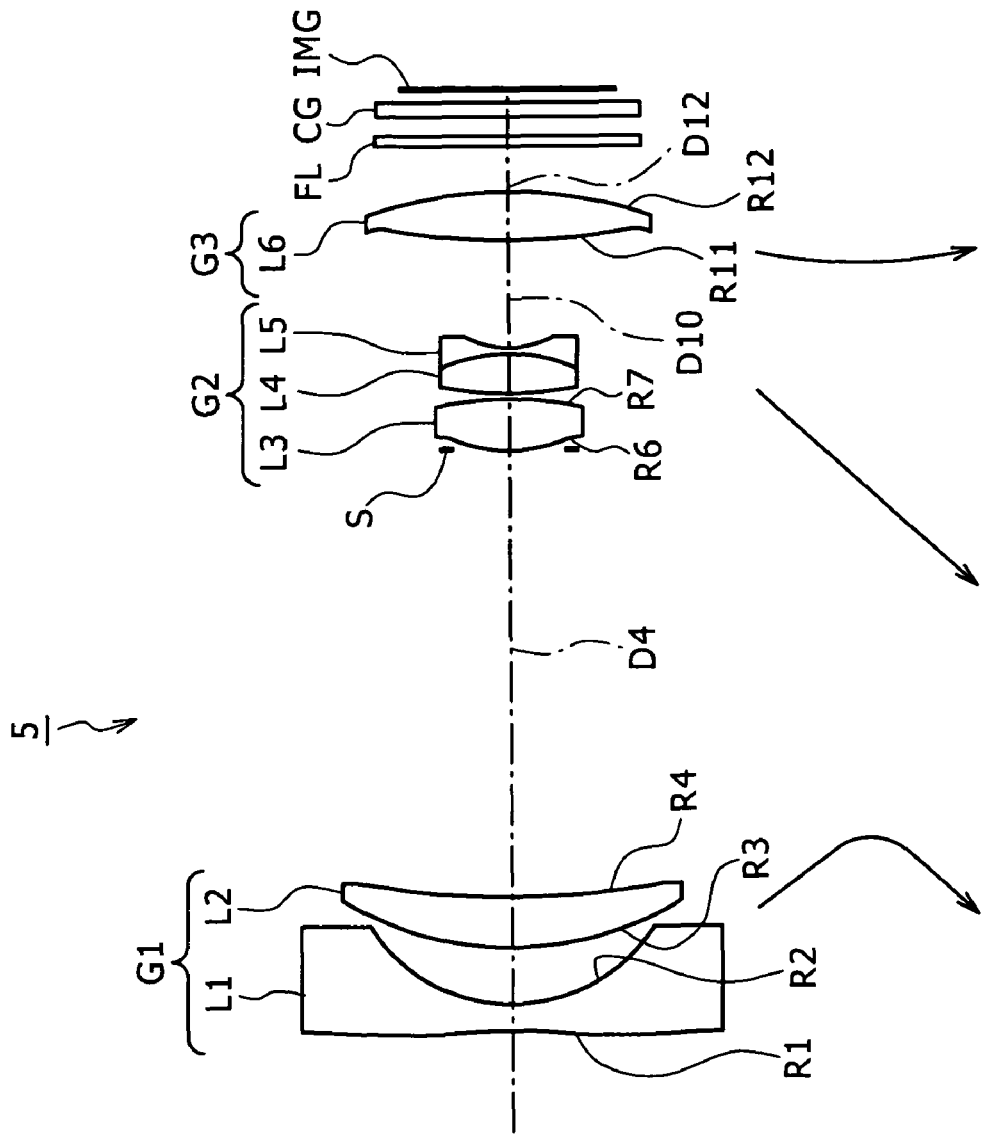
FIG. 17 is a diagram showing the lens configuration of a fifth embodiment of the zoom lens according to the present invention.

FIG. 17 is a diagram showing the lens configuration of a zoom lens 5 according to a fifth embodiment of the present invention.

The zoom lens 5 according to the fifth embodiment has six lenses, as shown in FIG. 17.

The zoom lens 5 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 13 shows lens data of a fifth numerical embodiment in which concrete numerical values are applied to the zoom lens 5 according to the fifth embodiment.

TABLE 13

| Si | Ri            | Di    | Nn      | νn    |
|----|---------------|-------|---------|-------|
| 1  | −37.751 (ASP) | 1.085 | 1.85135 | 40.1  |
| 2  | 6.552 (ASP)   | 2.156 |         |       |
| 3  | 10.316 (ASP)  | 2.037 | 2.00178 | 19.3  |
| 4  | 20.713 (ASP)  | D4    |         |       |
| 5  | DIAPHRAGM     | 0.000 |         |       |
| 6  | 6.007 (ASP)   | 2.000 | 1.62263 | 58.16 |
| 7  | −12.637 (ASP) | 0.150 |         |       |
| 8  | 12.190        | 1.477 | 1.83481 | 47.2  |
| 9  | −6.072        | 0.400 | 1.68893 | 31.2  |
| 10 | 3.722         | D10   |         |       |
| 11 | 33.877 (ASP)  | 1.850 | 1.61881 | 63.9  |
| 12 | −12.155 (ASP) | D12   |         |       |
| 13 | INF           | 0.300 | 1.51872 | 64.2  |
| 14 | INF           | 0.720 |         |       |
| 15 | INF           | 0.500 | 1.51872 | 64.2  |
| 16 | INF           | 0.600 |         |       |

In the zoom lens 5, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the fifth numerical embodiment are shown in Table 14 together with the conic constant K.

TABLE 14

| Si | K           | A4           | A6           | A8           | A10          |
|----|-------------|--------------|--------------|--------------|--------------|
| 1  | 0.00000E+00 | 7.28063E−04  | −1.14820E−05 | 6.32923E−08  | −9.11690E−11 |
| 2  | 0.00000E+00 | −3.01495E−04 | 5.97981E−05  | −1.62440E−06 | 2.67502E−09  |
| 3  | 0.00000E+00 | −8.24673E−04 | 3.98809E−05  | −1.06367E−06 | 1.07889E−08  |
| 4  | 0.00000E+00 | −5.61184E−04 | 2.16383E−05  | −7.25878E−07 | 8.31486E−09  |
| 6  | 0.00000E+00 | −1.42483E−03 | −6.67654E−05 | −3.55720E−06 | −2.45838E−07 |
| 7  | 0.00000E+00 | 3.48198E−05  | −7.43320E−05 | −2.08918E−06 | −1.23087E−07 |
| 11 | 0.00000E+00 | 7.08000E−04  | −7.21864E−05 | 4.52026E−06  | −1.08313E−07 |
| 12 | 0.00000E+00 | 1.71107E−03  | −1.20107E−04 | 6.25978E−06  | −1.34675E−07 |

In the zoom lens 5, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=8.01), and a telephoto end state (focal length f=17.47) of each surface interval in the fifth numerical embodiment are shown in Table 15 together with an F-number Fno and a half angle of view ω.

TABLE 15

| f | 3.71 | 8.01 | 17.47 |
|---|------|------|-------|
| Fno | 2.58 | 3.61 | 6.05 |
| ω | 47.82 | 25.97 | 12.58 |
| D4 | 17.200 | 5.726 | 0.800 |
| D10 | 4.025 | 8.809 | 20.425 |
| D12 | 1.899 | 2.256 | 1.900 |

Figure 18:
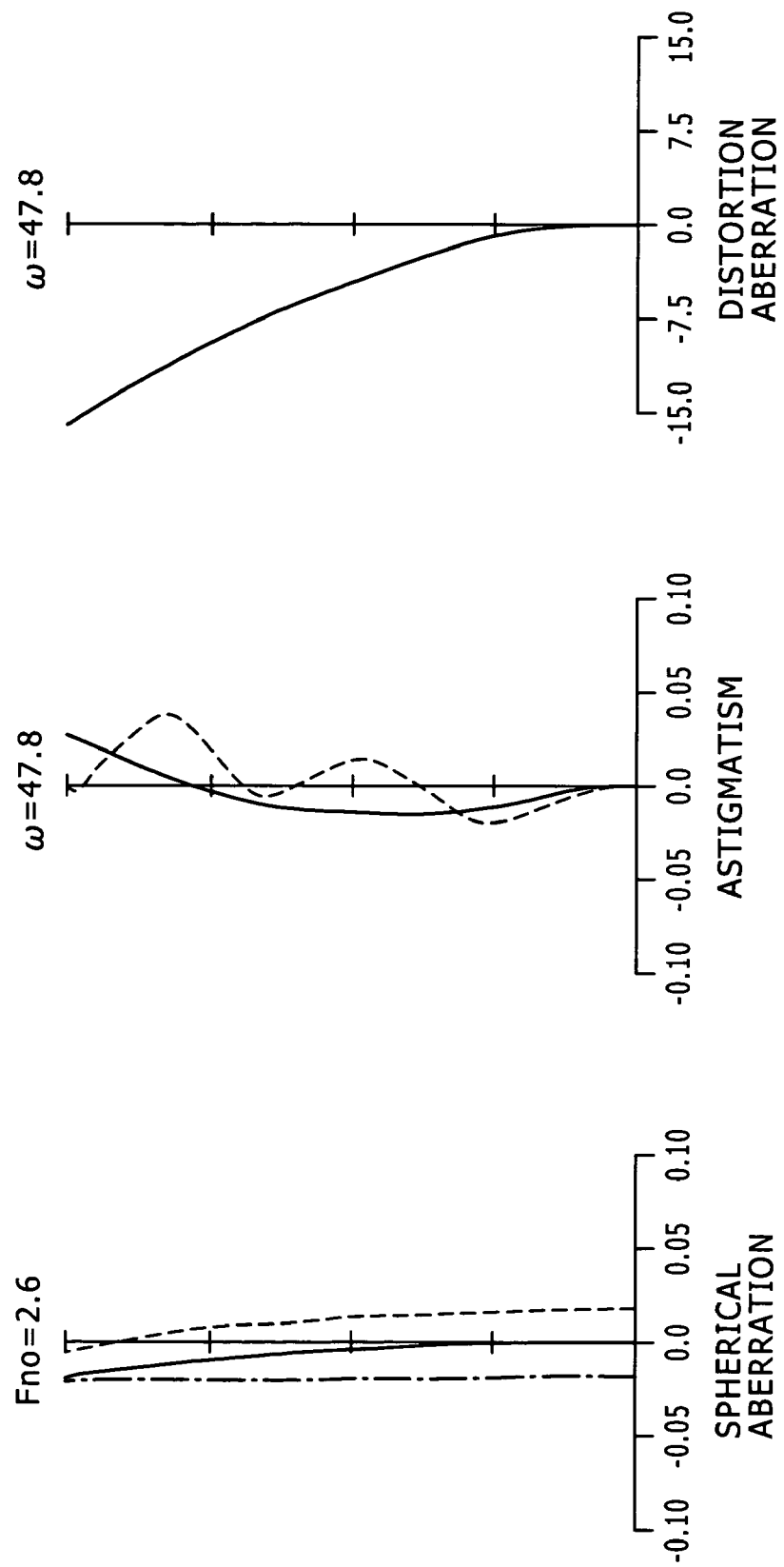
FIG. 18 is a diagram showing aberrations of a numerical embodiment in which concrete numerical values are applied to the fifth embodiment together with FIG. 19 and FIG. 20, FIG. 18 being a diagram showing spherical aberration, astigmatism, and distortion aberration in a wide-angle end state.
Figure 19:
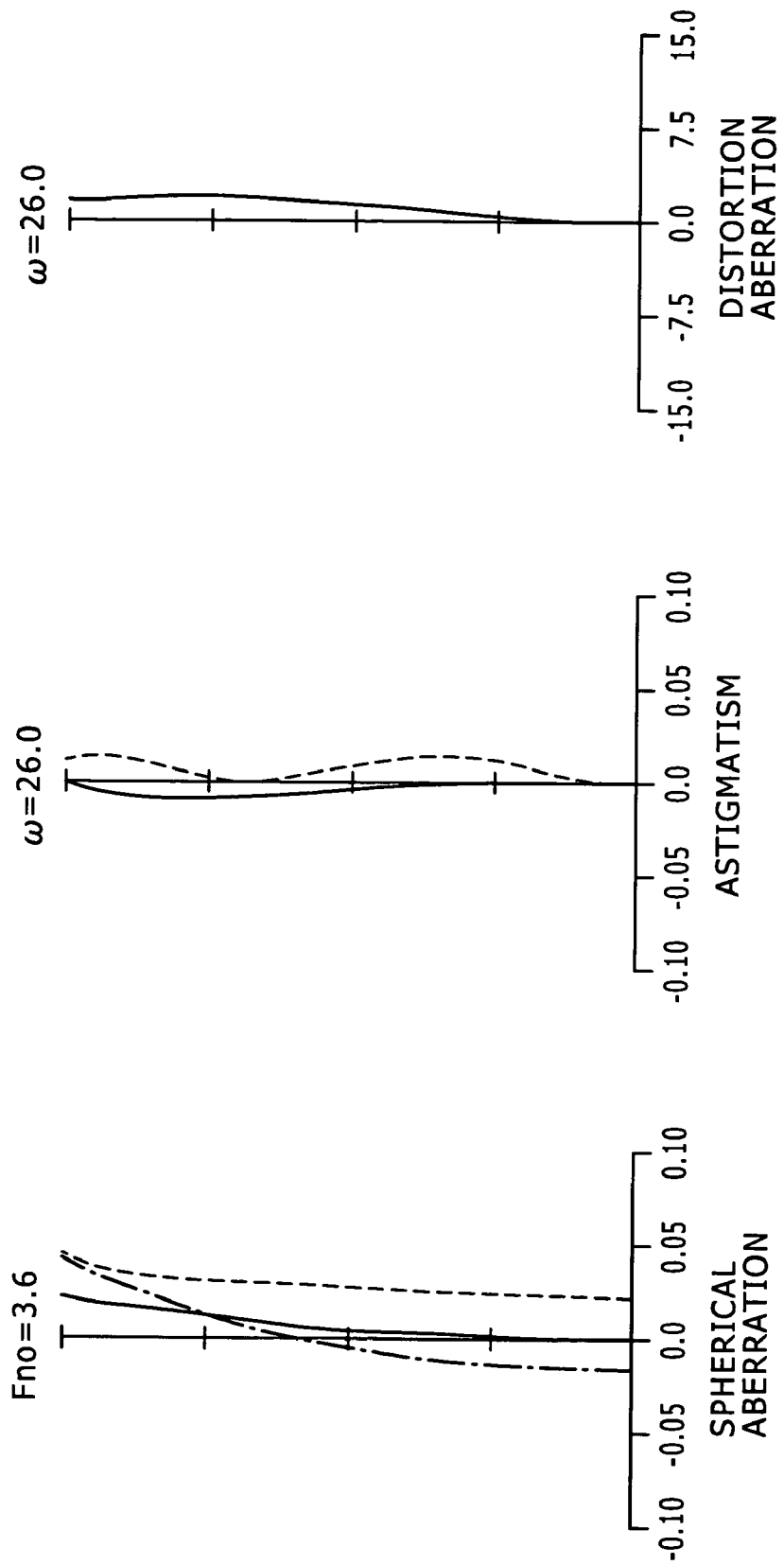
FIG. 19 is a diagram showing spherical aberration, astigmatism, and distortion aberration in an intermediate focal length state.
Figure 20:
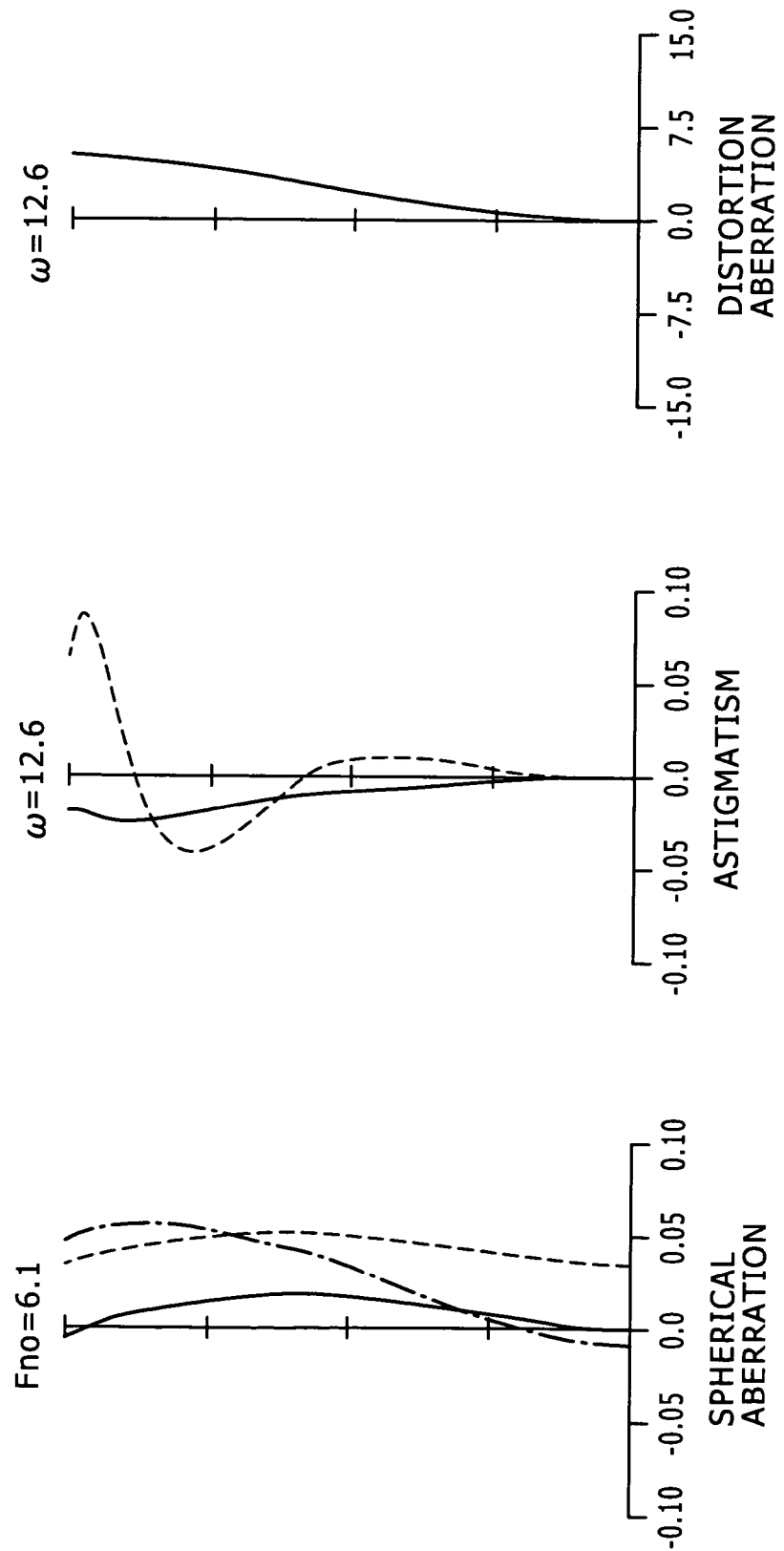
FIG. 20 is a diagram showing spherical aberration, astigmatism, and distortion aberration in a telephoto end state.

FIGS. 18 to 20 are diagrams of various aberrations in an infinity in-focus state in the fifth numerical embodiment. FIG. 18 is a diagram of various aberrations in the wide-angle end state (focal length f=3.71). FIG. 19 is a diagram of various aberrations in the intermediate focal length state (focal length f=8.01). FIG. 20 is a diagram of various aberrations in the telephoto end state (focal length f=17.47).

In the diagrams of spherical aberrations shown in FIGS. 18 to 20, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 18 to 20, a value in a sagittal image surface is shown by a solid line, and a value in a meridional image surface is shown by a broken line.

It is clear from each aberration diagram that the fifth numerical embodiment favorably corrects various aberrations and has excellent image forming performance.

Figure 21:
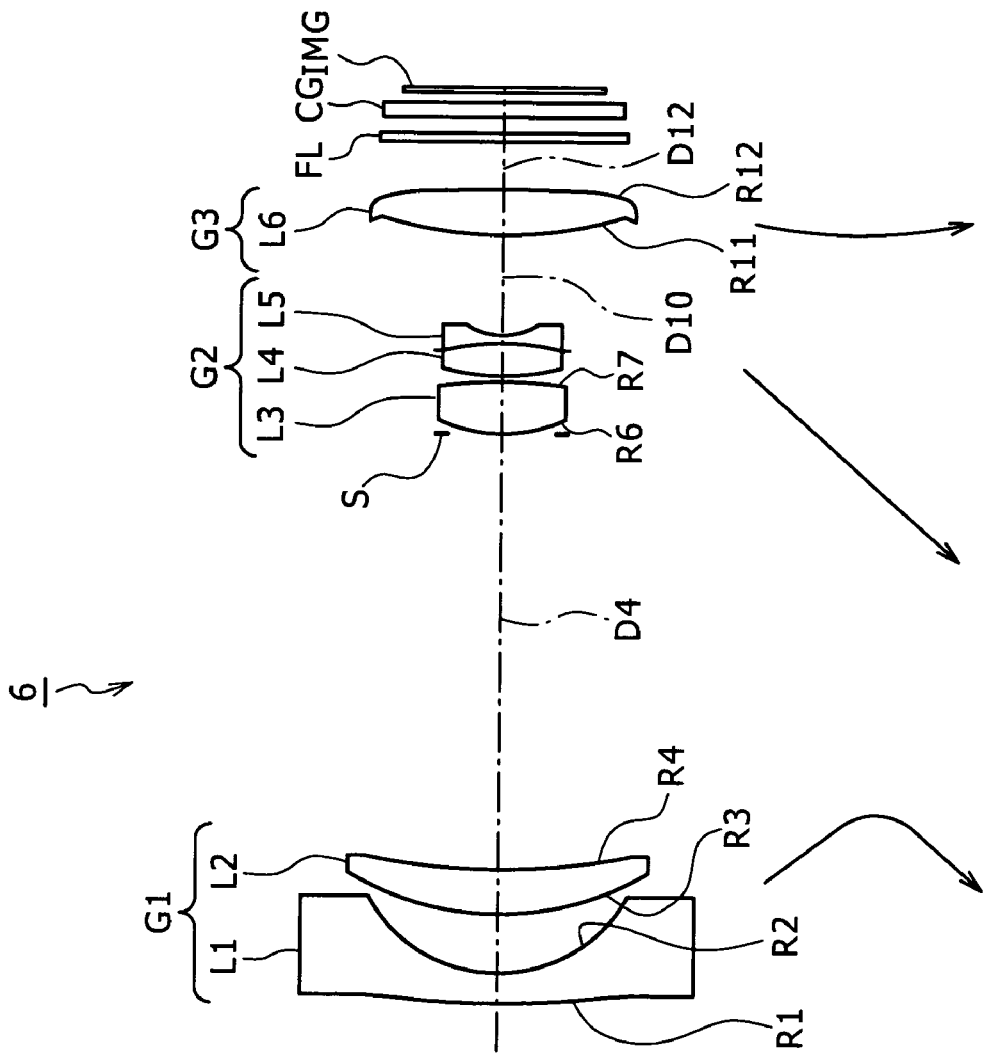
FIG. 21 is a diagram showing the lens configuration of a sixth embodiment of the zoom lens according to the present invention.

FIG. 21 is a diagram showing the lens configuration of a zoom lens 6 according to a sixth embodiment of the present invention.

The zoom lens 6 according to the sixth embodiment has six lenses, as shown in FIG. 21.

The zoom lens 6 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative lens having both surfaces formed as aspheric surfaces and having a concave surface facing the image side and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 16 shows lens data of a sixth numerical embodiment in which concrete numerical values are applied to the zoom lens 6 according to the sixth embodiment.

TABLE 16

| Si | Ri | Di | Nn | νn |
|----|----|----|----|----|
| 1 | INF (ASP) | 1.075 | 1.85135 | 40.1 |
| 2 | 5.554 (ASP) | 2.324 | | |
| 3 | 10.347 (ASP) | 1.976 | 2.00178 | 19.3 |
| 4 | 20.151 (ASP) | D4 | | |
| 5 | DIAPHRAGM | 0.000 | | |
| 6 | 5.641 (ASP) | 2.200 | 1.58913 | 61.3 |
| 7 | −13.174 (ASP) | 0.135 | | |
| 8 | 9.067 | 1.284 | 1.83481 | 42.7 |
| 9 | −11.209 | 0.400 | 1.69895 | 30.1 |
| 10 | 3.533 | D10 | | |
| 11 | 19.958 (ASP) | 1.807 | 1.61881 | 63.9 |
| 12 | −18.367 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 6, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the sixth numerical embodiment are shown in Table 17 together with the conic constant K.

TABLE 17

| Si | K | A4 | A6 | A8 | A10 |
|----|---|----|----|----|-----|
| 1 | 0.00000E+00 | 4.86660E−04 | −1.24374E−05 | 1.16122E−07 | −4.53947E−10 |
| 2 | −4.33318E−01 | −3.89404E−04 | 6.04487E−06 | −2.28709E−06 | 1.93496E−08 |
| 3 | 1.96969E−01 | −9.03955E−04 | 4.46980E−05 | −1.32403E−06 | 1.59840E−08 |
| 4 | −2.09914E−01 | −6.84772E−04 | 2.96321E−05 | −1.06849E−06 | 1.61050E−08 |
| 6 | 0.00000E+00 | −1.33518E−03 | −7.76680E−05 | 1.41643E−06 | −6.13783E−07 |
| 7 | 0.00000E+00 | −3.52216E−05 | −9.73671E−05 | 5.80603E−06 | −8.36590E−07 |
| 11 | 0.00000E+00 | 1.08094E−03 | −7.62916E−05 | 3.90179E−06 | −1.01998E−07 |
| 12 | 0.00000E+00 | 2.02180E−03 | −1.08590E−04 | 4.02578E−06 | −9.24378E−08 |

In the zoom lens 6, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=8.00), and a telephoto end state (focal length f=17.47) of each surface interval in the sixth numerical embodiment are shown in Table 18 together with an F-number Fno and a half angle of view ω.

TABLE 18

| f | 3.71 | 8.00 | 17.47 |
|---|---|---|---|
| Fno | 2.62 | 3.65 | 6.16 |
| ω | 47.82 | 25.99 | 12.58 |
| D4 | 17.445 | 5.842 | 0.997 |
| D10 | 4.024 | 8.666 | 20.583 |
| D12 | 1.900 | 2.399 | 1.900 |

Figure 22:
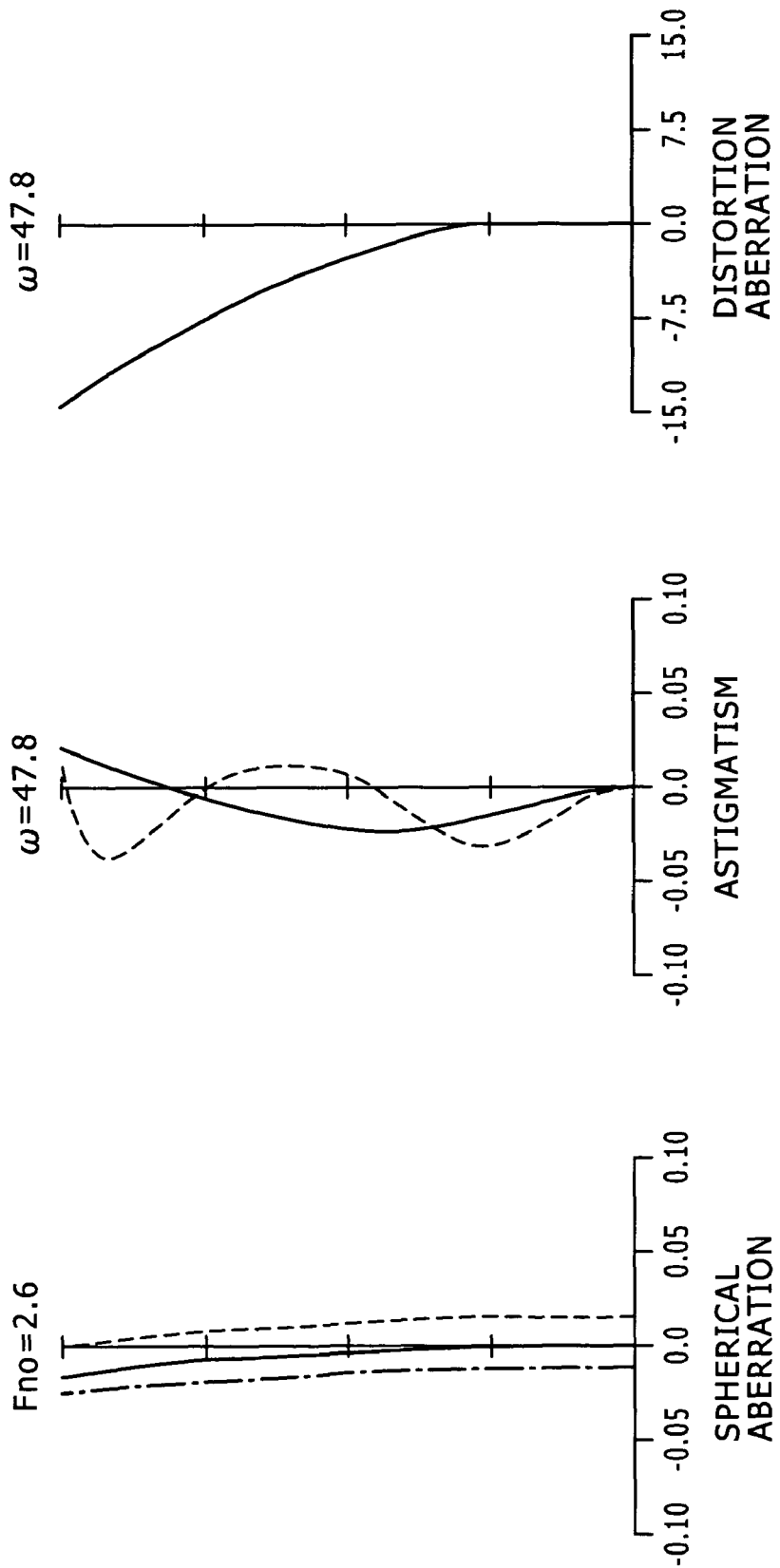
FIG. 22 is a diagram showing aberrations of a numerical embodiment in which concrete numerical values are applied to the sixth embodiment together with FIG. 23 and FIG. 24, FIG. 22 being a diagram showing spherical aberration, astigmatism, and distortion aberration in a wide-angle end state.
Figure 23:
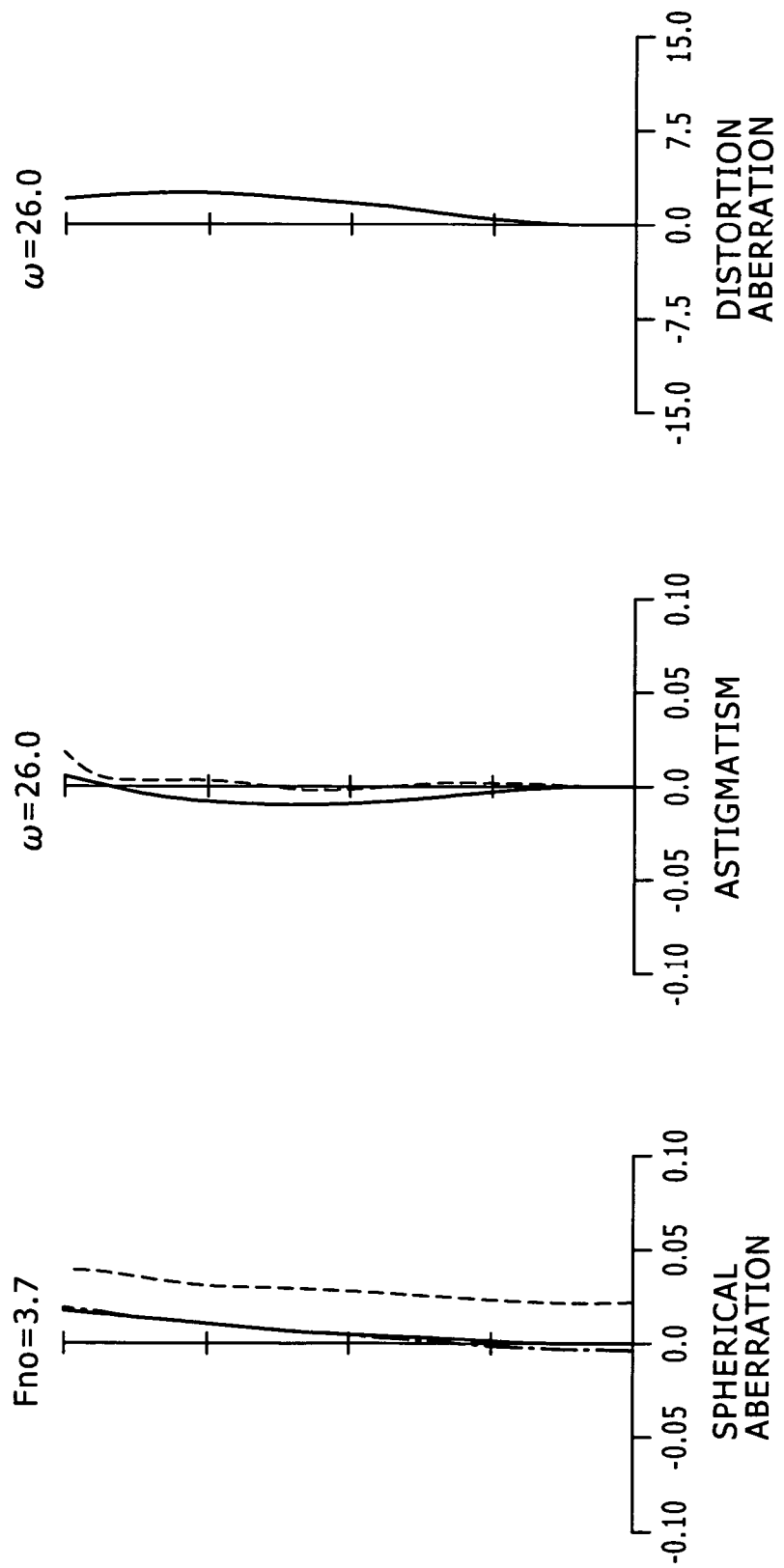
FIG. 23 is a diagram showing spherical aberration, astigmatism, and distortion aberration in an intermediate focal length state.
Figure 24:
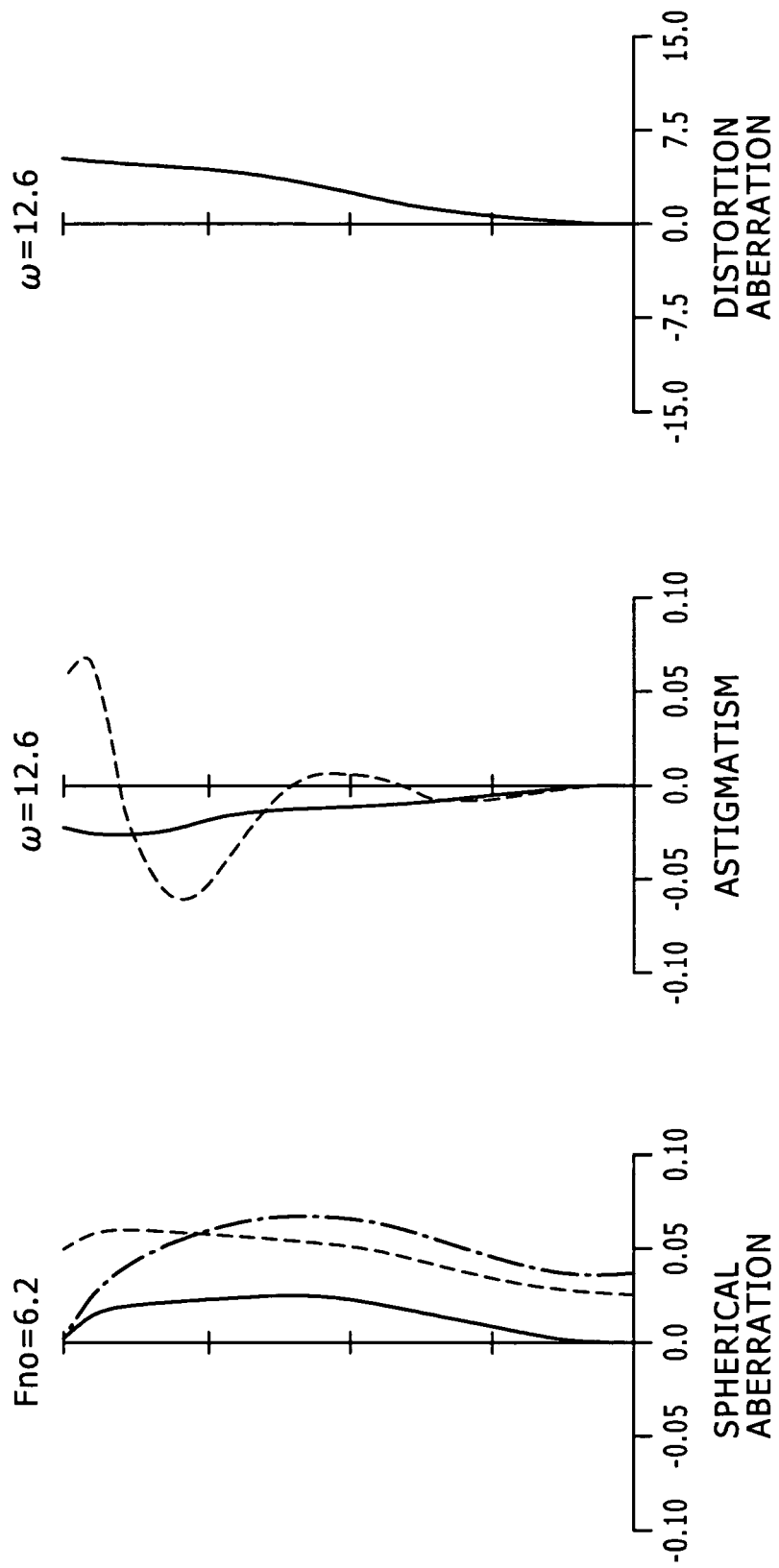
FIG. 24 is a diagram showing spherical aberration, astigmatism, and distortion aberration in a telephoto end state.

FIGS. 22 to 24 are diagrams of various aberrations in an infinity in-focus state in the sixth numerical embodiment. FIG. 22 is a diagram of various aberrations in the wide-angle end state (focal length f=3.71). FIG. 23 is a diagram of various aberrations in the intermediate focal length state (focal length f=8.00). FIG. 24 is a diagram of various aberrations in the telephoto end state (focal length f=17.47).

In the diagrams of spherical aberrations shown in FIGS. 22 to 24, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 22 to 24, a value in a sagittal image surface is shown by a solid line, and a value in a meridional image surface is shown by a broken line.

It is clear from each aberration diagram that the sixth numerical embodiment favorably corrects various aberrations and has excellent image forming performance.

Figure 25:
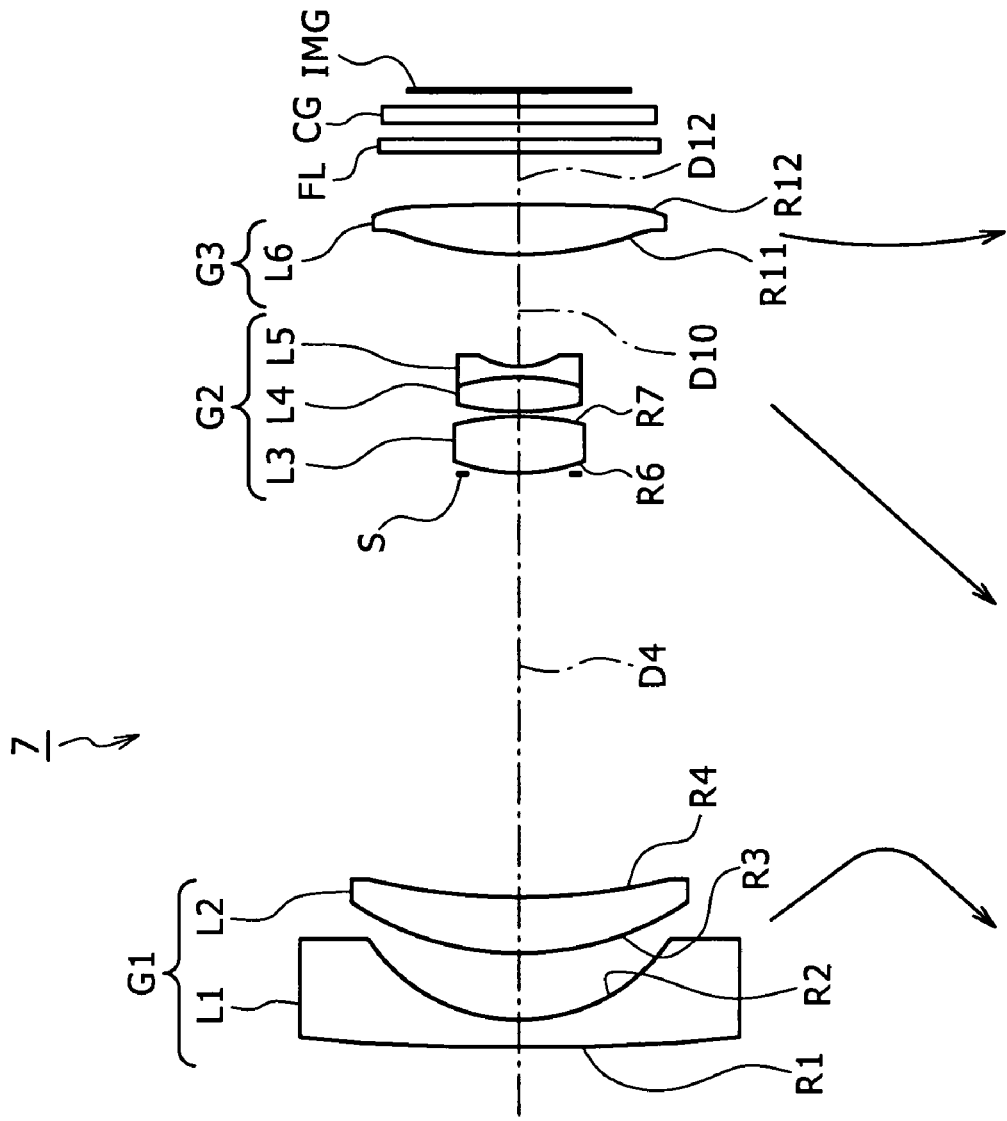
FIG. 25 is a diagram showing the lens configuration of a seventh embodiment of the zoom lens according to the present invention.

FIG. 25 is a diagram showing the lens configuration of a zoom lens 7 according to a seventh embodiment of the present invention.

The zoom lens 7 according to the seventh embodiment has six lenses, as shown in FIG. 25.

The zoom lens 7 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative lens having both surfaces formed as aspheric surfaces and having a concave surface facing the image side and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 19 shows lens data of a seventh numerical embodiment in which concrete numerical values are applied to the zoom lens 7 according to the seventh embodiment.

TABLE 19

| Si | Ri | Di | Nn | νn |
|---|---|---|---|---|
| 1 | INF (ASP) | 1.005 | 1.85135 | 40.1 |
| 2 | 5.430 (ASP) | 2.422 | | |
| 3 | 10.253 (ASP) | 2.073 | 2.00178 | 19.3 |
| 4 | 20.110 (ASP) | D4 | | |
| 5 | DIAPHRAGM | 0.000 | | |
| 6 | 6.267 (ASP) | 2.107 | 1.62263 | 58.2 |
| 7 | −10.967 (ASP) | 0.100 | | |
| 8 | 12.578 | 1.293 | 1.88300 | 40.8 |
| 9 | −6.283 | 0.400 | 1.69895 | 30.1 |
| 10 | 3.745 | D10 | | |
| 11 | 17.651 (ASP) | 1.787 | 1.61881 | 63.9 |
| 12 | −18.654 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

In the zoom lens 7, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the seventh numerical embodiment are shown in Table 20 together with the conic constant K.

TABLE 20

| Si | K | A4 | A6 | A8 | A10 |
|---|---|---|---|---|---|
| 1 | 0.00000E+00 | 1.59884E−04 | −3.72197E−06 | 7.91757E−08 | −6.20424E−10 |
| 2 | −8.12109E−01 | −2.81792E−04 | 5.87018E−06 | −2.39167E−06 | 4.42154E−08 |
| 3 | 2.10615E+00 | −6.55595E−04 | 2.96301E−05 | −1.37344E−06 | 6.73062E−09 |
| 4 | 1.20906E+01 | −4.78671E−04 | 2.28519E−05 | −1.42379E−06 | 1.25900E−08 |
| 6 | 0.00000E+00 | −1.87629E−03 | −1.24179E−04 | 6.58784E−06 | −1.88322E−06 |
| 7 | 0.00000E+00 | −2.42967E−04 | −1.73790E−04 | 2.38709E−05 | −3.46370E−06 |
| 11 | 0.00000E+00 | 1.75855E−03 | −1.22088E−04 | 5.57392E−06 | −1.26236E−07 |
| 12 | 0.00000E+00 | 3.05623E−03 | −1.77526E−04 | 6.43656E−06 | −1.28821E−07 |

In the zoom lens 7, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=3.71), an intermediate focal length state (focal length f=7.22), and a telephoto end state (focal length f=14.10) of each surface interval in the seventh numerical embodiment are shown in Table 21 together with an F-number Fno and a half angle of view ω.

TABLE 21

| f | 3.71 | 7.22 | 14.10 |
|---|---|---|---|
| Fno | 2.89 | 3.80 | 5.83 |
| ω | 47.82 | 28.37 | 15.46 |
| D4 | 15.179 | 5.270 | 0.826 |
| D10 | 4.014 | 7.717 | 16.597 |
| D12 | 1.900 | 2.374 | 1.900 |

Figure 26:
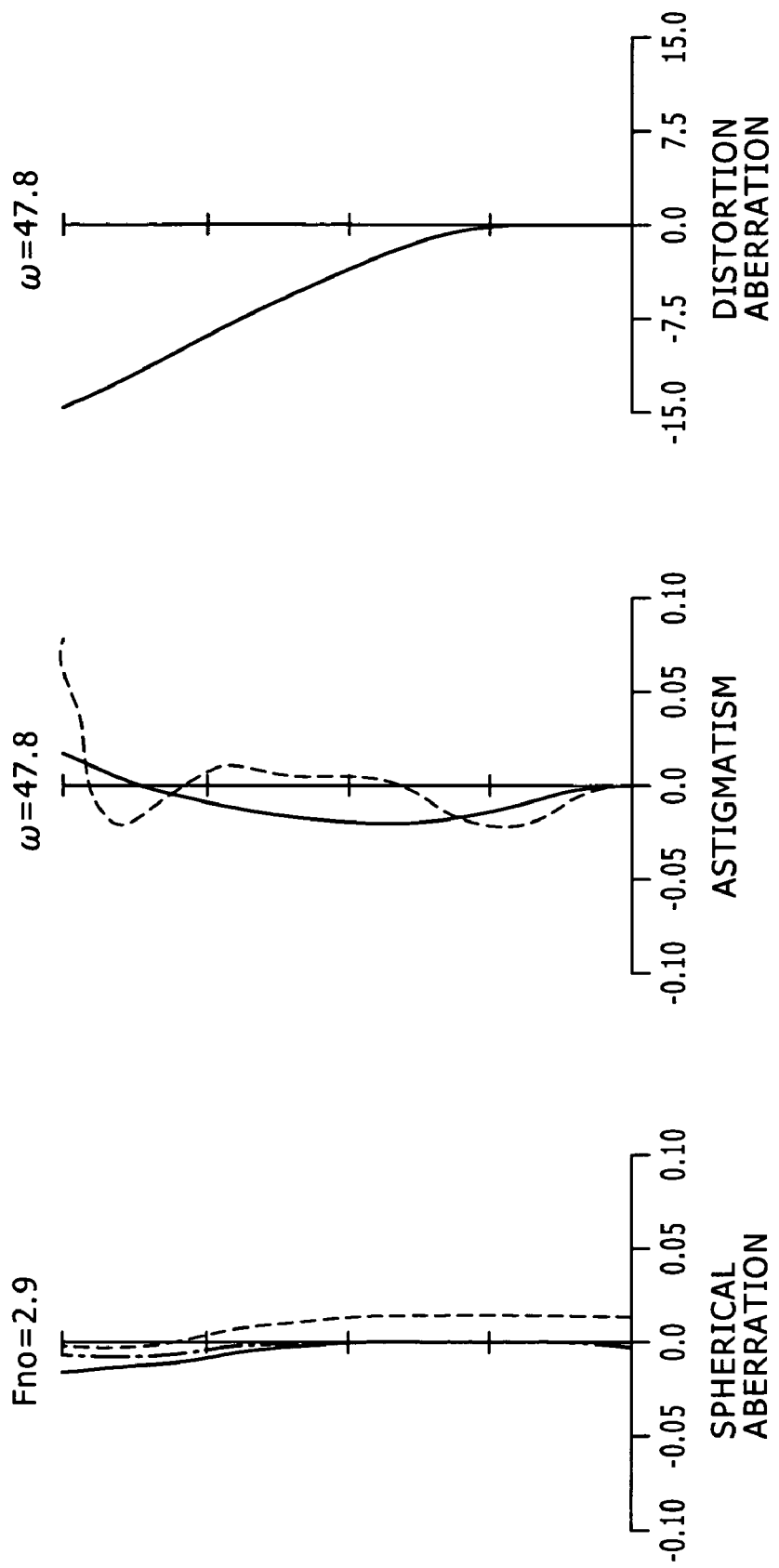
FIG. 26 is a diagram showing aberrations of a numerical embodiment in which concrete numerical values are applied to the seventh embodiment together with FIG. 27 and FIG. 28, FIG. 26 being a diagram showing spherical aberration, astigmatism, and distortion aberration in a wide-angle end state.
Figure 27:
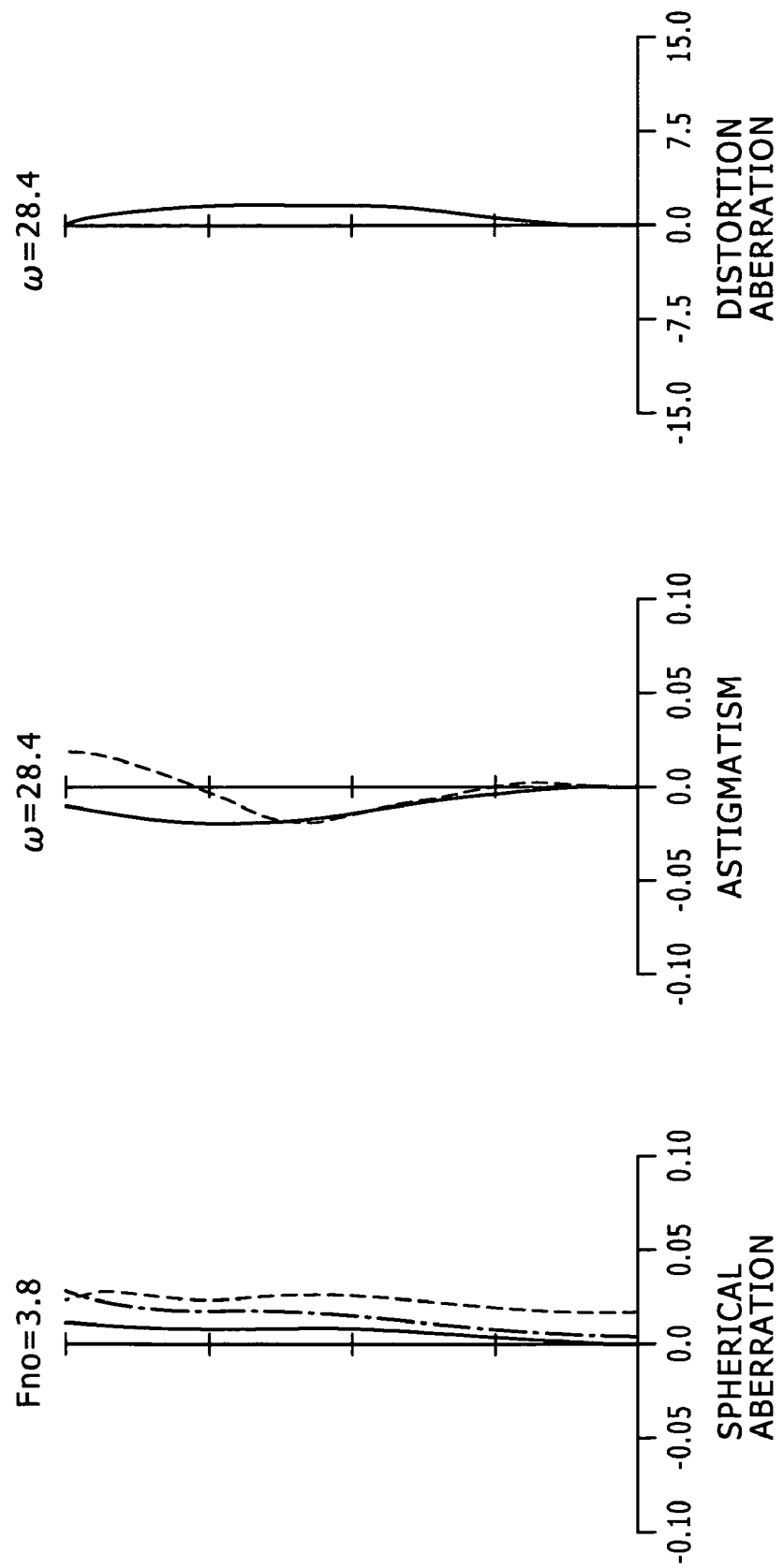
FIG. 27 is a diagram showing spherical aberration, astigmatism, and distortion aberration in an intermediate focal length state.
Figure 28:
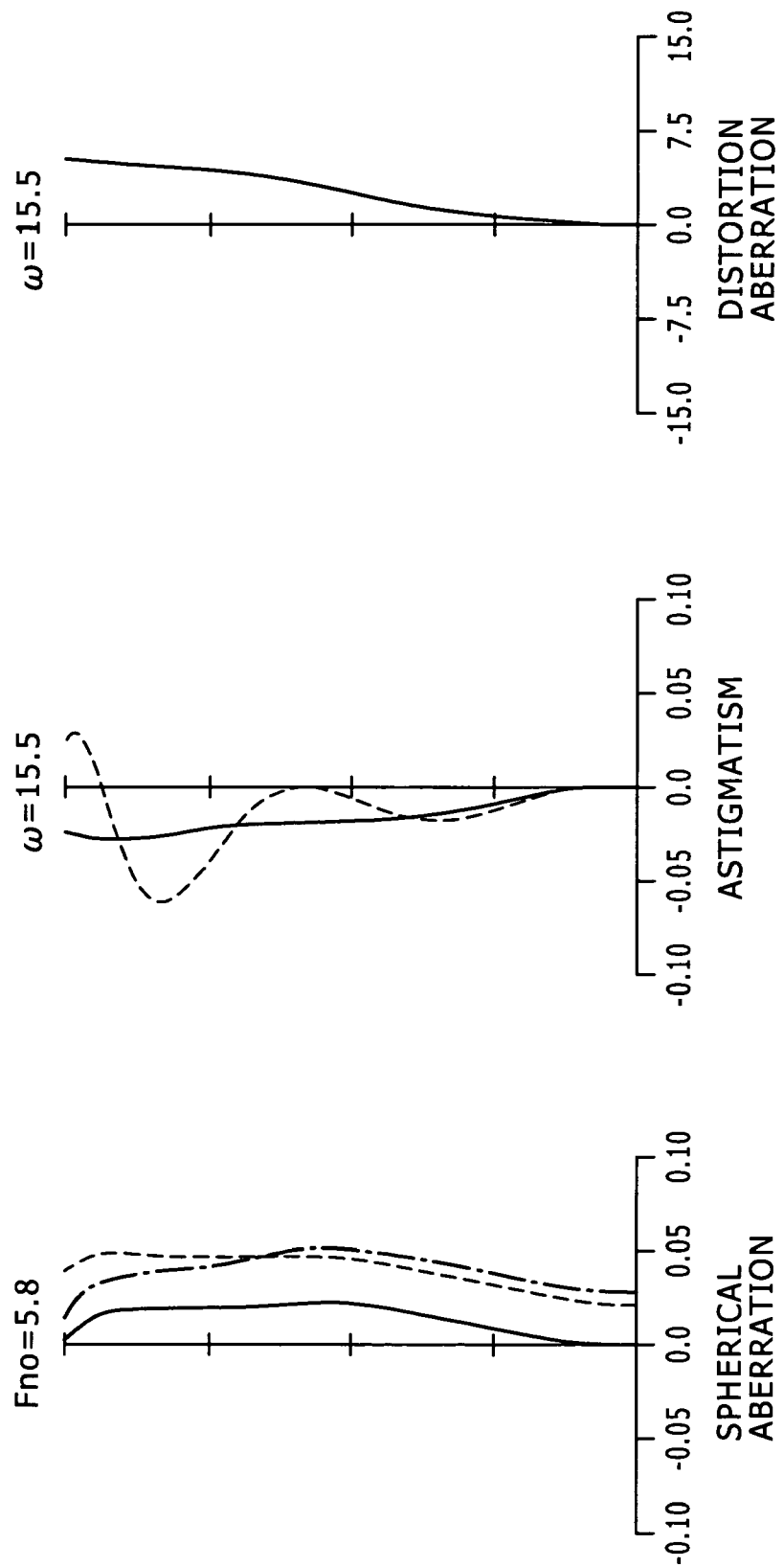
FIG. 28 is a diagram showing spherical aberration, astigmatism, and distortion aberration in a telephoto end state.

FIGS. 26 to 28 are diagrams of various aberrations in an infinity in-focus state in the seventh numerical embodiment. FIG. 26 is a diagram of various aberrations in the wide-angle end state (focal length f=3.71). FIG. 27 is a diagram of various aberrations in the intermediate focal length state (focal length f=7.22). FIG. 28 is a diagram of various aberrations in the telephoto end state (focal length f=14.10).

In the diagrams of spherical aberrations shown in FIGS. 26 to 28, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 26 to 28, a value in a sagittal image surface is shown by a solid line, and a value in a meridional image surface is shown by a broken line.

It is clear from each aberration diagram that the seventh numerical embodiment favorably corrects various aberrations and has excellent image forming performance.

Figure 29:
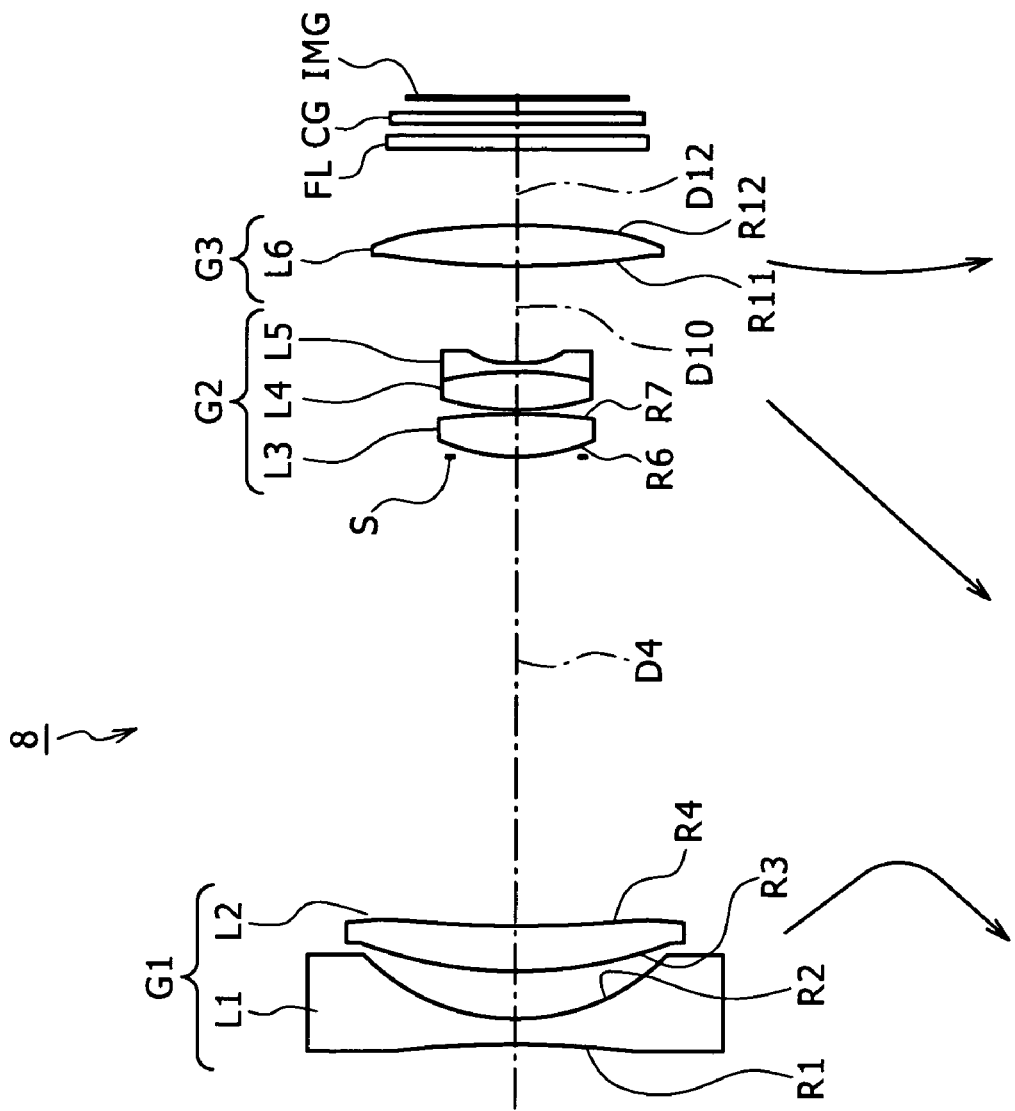
FIG. 29 is a diagram showing the lens configuration of an eighth embodiment of the zoom lens according to the present invention.

FIG. 29 is a diagram showing the lens configuration of a zoom lens 8 according to an eighth embodiment of the present invention.

The zoom lens 8 according to the eighth embodiment has six lenses, as shown in FIG. 29.

The zoom lens 8 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative lens having both surfaces formed as aspheric surfaces and having a concave surface facing the image side and a second lens L2 as a positive meniscus lens having both surfaces formed as aspheric surfaces and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface R5) is disposed between the first lens group G1 and the second lens group G2.

A filter FL and a cover glass CG are arranged in order from the object side to the image side between the third lens group G3 and an image surface IMG.

Table 22 shows lens data of an eighth numerical embodiment in which concrete numerical values are applied to the zoom lens 8 according to the eighth embodiment.

TABLE 22

| Si | Ri | Di | Nn | νn |
|---|---|---|---|---|
| 1 | −51.514 (ASP) | 1.050 | 1.85135 | 40.1 |
| 2 | 7.311 (ASP) | 1.850 | | |
| 3 | 14.569 (ASP) | 1.800 | 2.00178 | 19.3 |
| 4 | 52.197 (ASP) | D4 | | |
| 5 | DIAPHRAGM | 0.000 | | |
| 6 | 5.482 (ASP) | 1.650 | 1.62263 | 58.2 |
| 7 | −21.626 (ASP) | 0.150 | | |
| 8 | 9.266 | 1.400 | 1.81600 | 46.6 |
| 9 | −13.371 | 0.400 | 1.69895 | 30.1 |
| 10 | 3.594 | D10 | | |
| 11 | 27.271 (ASP) | 1.620 | 1.69350 | 53.2 |
| 12 | −16.772 (ASP) | D12 | | |
| 13 | INF | 0.400 | 1.51872 | 64.2 |
| 14 | INF | 0.500 | | |
| 15 | INF | 0.500 | 1.51872 | 64.2 |
| 16 | INF | 0.500 | | |

In the zoom lens 8, the surface (R1) on the object side of the first lens L1 of the first lens group G1, the surface (R2) on the image side of the first lens L1 of the first lens group G1, the surface (R3) on the object side of the second lens L2 of the first lens group G1, the surface (R4) on the image side of the second lens L2 of the first lens group G1, the surface (R6) on the object side of the third lens L3 of the second lens group G2, the surface (R7) on the image side of the third lens L3 of the second lens group G2, the surface (R11) on the object side of the sixth lens L6 of the third lens group G3, and the surface (R12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the eighth numerical embodiment are shown in Table 23 together with the conic constant K.

TABLE 23

| Si | K | A4 | A6 | A8 | A10 |
|---|---|---|---|---|---|
| 1 | −1.02254E+01 | −1.56066E−05 | 6.42187E−06 | −1.06845E−07 | 5.41283E−10 |
| 2 | −2.58984E−01 | −4.17130E−04 | 3.01724E−05 | −7.88384E−07 | 8.90800E−09 |
| 3 | 1.53691E+00 | −4.06069E−04 | 2.24365E−05 | −5.97089E−07 | 2.85929E−09 |
| 4 | 1.52332E+01 | −3.27571E−04 | 1.76667E−05 | −4.47498E−07 | 3.63841E−10 |
| 6 | 7.58226E−01 | −1.63768E−03 | −7.24417E−05 | −6.04254E−07 | −8.31043E−07 |
| 7 | −1.99931E+01 | −2.51021E−04 | −3.27509E−05 | −3.27582E−06 | −3.59466E−07 |
| 11 | 1.37067E+01 | 2.57947E−04 | −3.59043E−05 | 1.88656E−06 | −4.07037E−08 |
| 12 | 8.81362E+00 | 1.06610E−03 | −3.49601E−05 | 1.41870E−06 | −1.61585E−08 |

In the zoom lens 8, at a time of varying power between a wide-angle end state and a telephoto end state, a surface interval D4 between the first lens group G1 and the second lens group G2, a surface interval D10 between the second lens group G2 and the third lens group G3, and a surface interval D12 between the third lens group G3 and the filter FL are changed. Variable intervals in a wide-angle end state (focal length f=4.30), an intermediate focal length state (focal length f=9.60), and a telephoto end state (focal length f=21.50) of each surface interval in the eighth numerical embodiment are shown in Table 24 together with an F-number Fno and a half angle of view ω.

TABLE 24

| f   | 4.30   | 9.60   | 21.50  |
|-----|--------|--------|--------|
| Fno | 2.42   | 3.60   | 6.22   |
| ω   | 43.64  | 22.11  | 10.28  |
| D4  | 17.738 | 5.804  | 0.300  |
| D10 | 3.672  | 10.231 | 22.799 |
| D12 | 2.959  | 2.446  | 1.500  |

Figure 30:
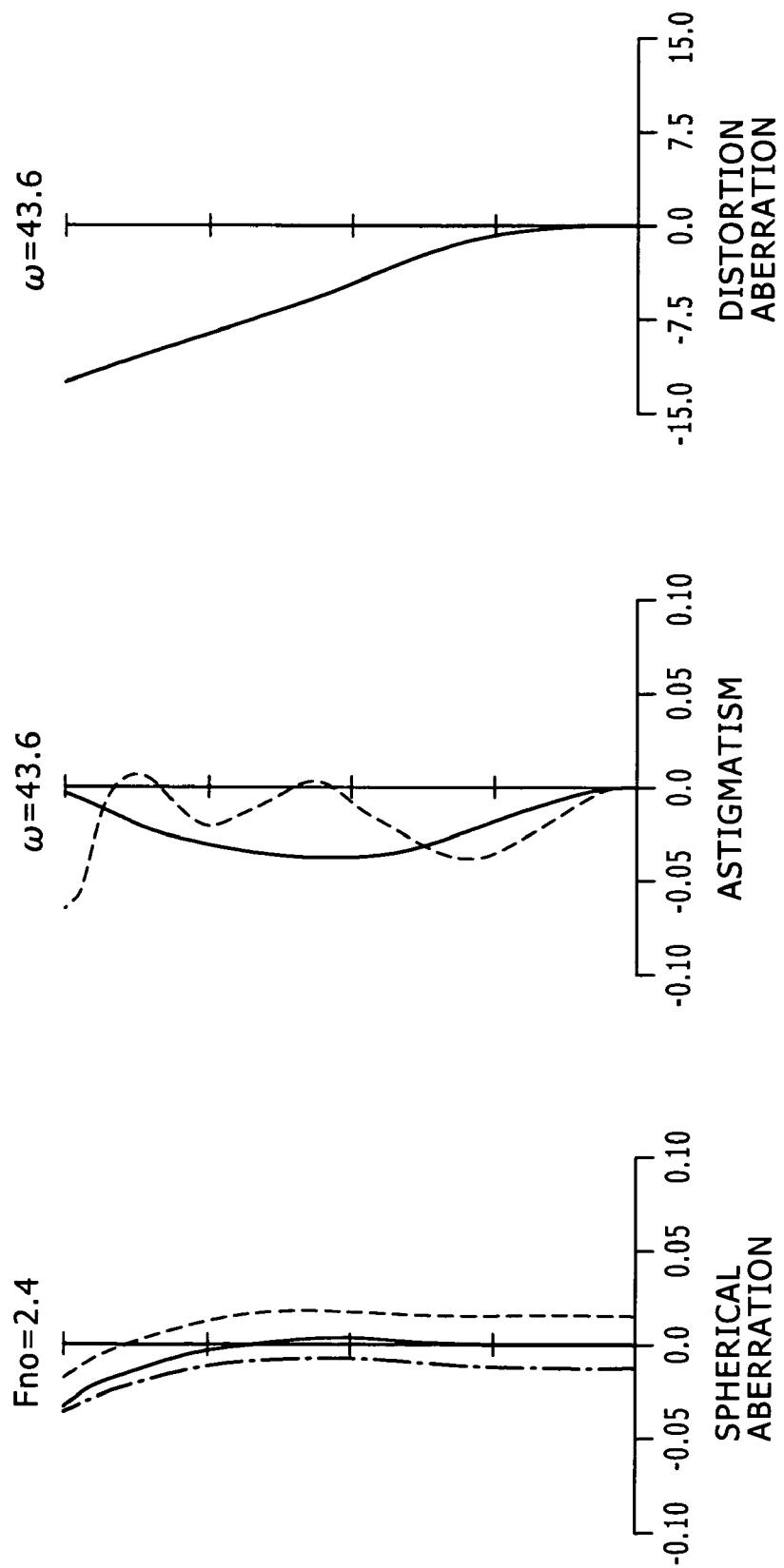
FIG. 30 is a diagram showing aberrations of a numerical embodiment in which concrete numerical values are applied to the eighth embodiment together with FIG. 31 and FIG. 32, FIG. 30 being a diagram showing spherical aberration, astigmatism, and distortion aberration in a wide-angle end state.
Figure 31:
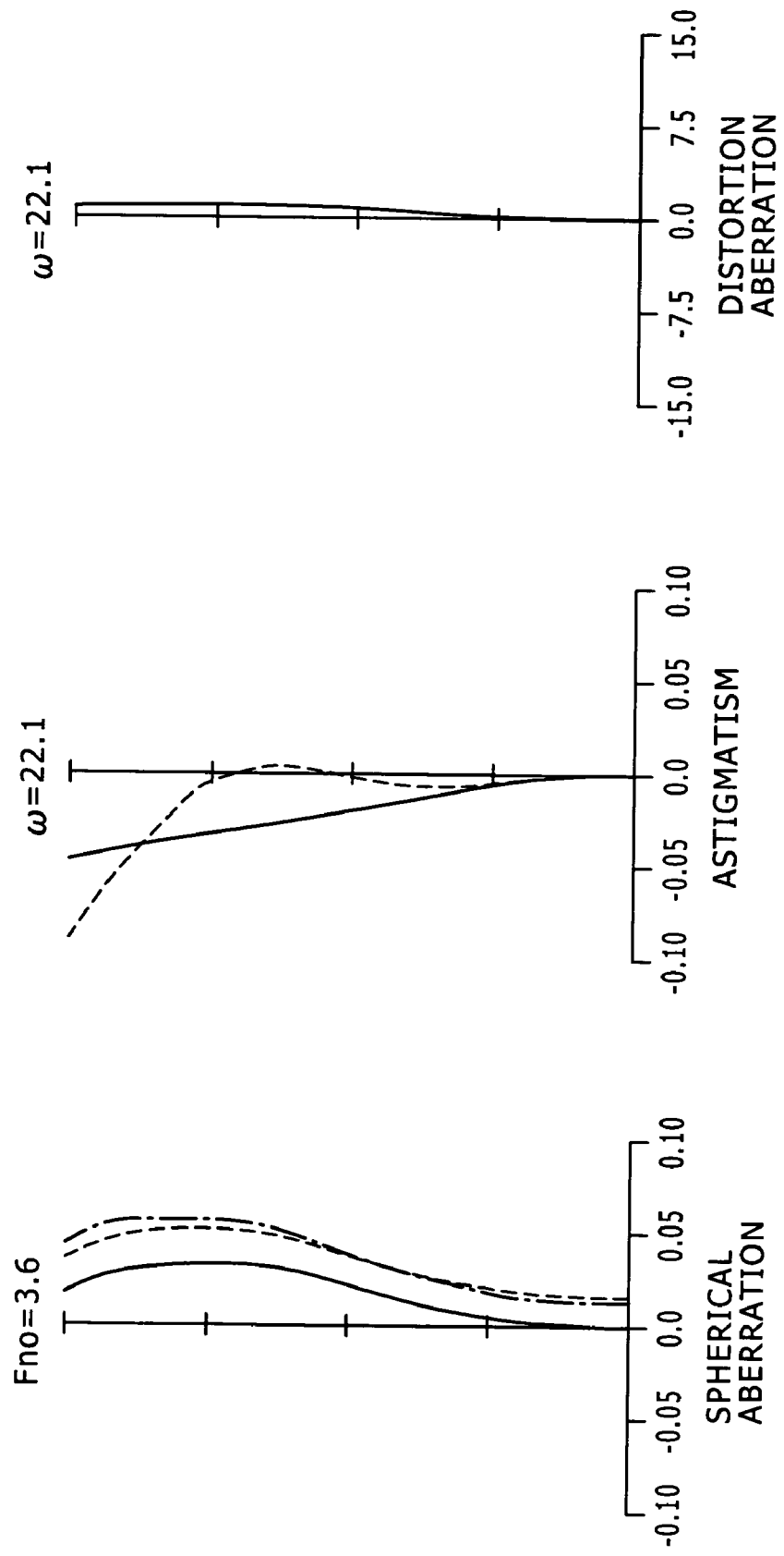
FIG. 31 is a diagram showing spherical aberration, astigmatism, and distortion aberration in an intermediate focal length state.
Figure 32:
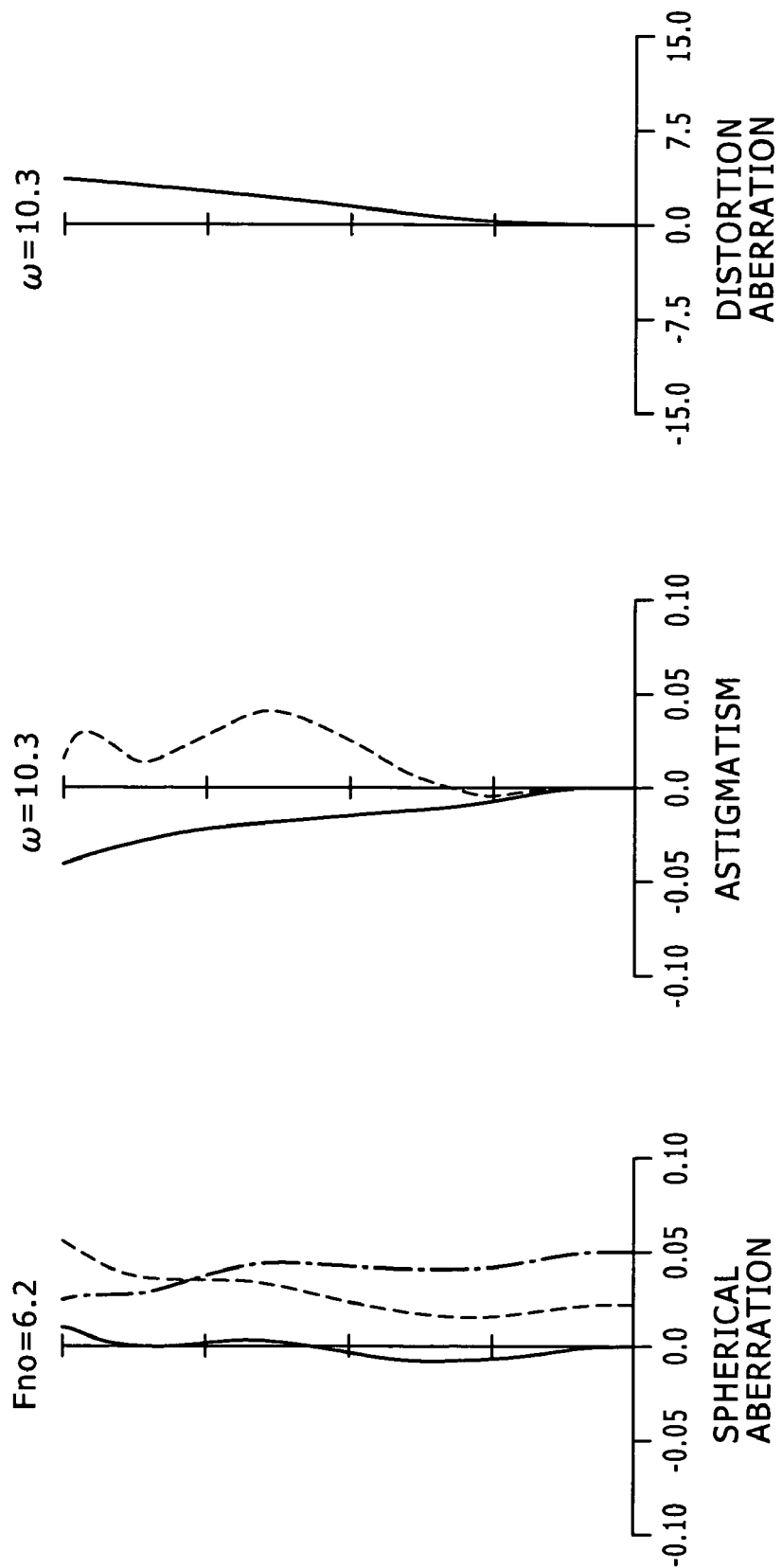
FIG. 32 is a diagram showing spherical aberration, astigmatism, and distortion aberration in a telephoto end state.

FIGS. 30 to 32 are diagrams of various aberrations in an infinity in-focus state in the eighth numerical embodiment. FIG. 30 is a diagram of various aberrations in the wide-angle end state (focal length f=4.30). FIG. 31 is a diagram of various aberrations in the intermediate focal length state (focal length f=9.60). FIG. 32 is a diagram of various aberrations in the telephoto end state (focal length f=21.50).

In the diagrams of spherical aberrations shown in FIGS. 30 to 32, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 30 to 32, a value in a sagittal image surface is shown by a solid line, and a value in a meridional image surface is shown by a broken line.

It is clear from each aberration diagram that the eighth numerical embodiment favorably corrects various aberrations and has excellent image forming performance.

Table 25 shows respective values of the above-described conditional expressions (1) to (5) in the zoom lenses 1 to 8, that is, Sgf, Sgr, and |Sgf/Sgr| of the conditional expression (1), f12, f1, and |f12/f1| of the conditional expression (2), t1, fw, and t1/fw of the conditional expression (3), N12 of the conditional expression (4), and ν12 of the conditional expression (5).

TABLE 25

|  | Numerical Embodiment 1 | Numerical Embodiment 2 | Numerical Embodiment 3 | Numerical Embodiment 4 |
|---|---|---|---|---|
| Sgf | −0.485 | −0.682 | −0.643 | −0.677 |
| Sgr | −0.253 | −0.401 | −0.400 | −0.513 |
| Conditional Expression (1) | 1.915 | 1.703 | 1.609 | 1.319 |
| f12 | 13.984 | 15.404 | 17.270 | 17.580 |
| f1 | −10.457 | −10.812 | −11.127 | −11.354 |
| t1 | 4.503 | 4.380 | 4.598 | 4.900 |
| fw | 3.710 | 3.710 | 3.710 | 3.710 |
| Conditional Expression (2) | 1.337 | 1.425 | 1.552 | 1.548 |
| Conditional Expression (3) | 1.214 | 1.181 | 1.239 | 1.321 |
| Conditional Expression (4) | 2.00170 | 2.00178 | 2.00178 | 2.00178 |
| Conditional Expression (5) | 20.60 | 19.30 | 19.30 | 19.30 |

TABLE 25-continued

|  | Numerical Embodiment 5 | Numerical Embodiment 6 | Numerical Embodiment 7 | Numerical Embodiment 8 |
|---|---|---|---|---|
| Sgf | −0.268 | −0.264 | −0.126 | −0.115 |
| Sgr | −0.242 | −0.266 | −0.135 | −0.184 |
| Conditional Expression (1) | 1.106 | 0.996 | 0.932 | 0.625 |
| f12 | 18.683 | 19.284 | 18.893 | 19.464 |
| f1 | −11.141 | −11.054 | −10.887 | −13.787 |
| t1 | 5.278 | 5.375 | 5.500 | 4.700 |
| fw | 3.710 | 3.710 | 3.710 | 4.300 |
| Conditional Expression (2) | 1.677 | 1.745 | 1.735 | 1.412 |
| Conditional Expression (3) | 1.423 | 1.449 | 1.482 | 1.093 |
| Conditional Expression (4) | 2.00178 | 2.00178 | 2.00178 | 2.00178 |
| Conditional Expression (5) | 19.30 | 19.30 | 19.30 | 19.30 |

As is clear from Table 25, the zoom lenses 1 to 8 satisfy the above-described conditional expressions (1) to (5).

Description will next be made of an image pickup device according to an embodiment of the present invention.

The image pickup device according to the embodiment of the present invention includes a zoom lens and an image pickup element for converting an optical image formed by the zoom lens into an electric signal.

The zoom lens provided in the image pickup device is formed by arranging a first lens group having a negative refractive power, a second lens group having a positive refractive power, and a third lens group having a positive refractive power in order from an object side to an image side.

In the zoom lens, at a time of varying power from a wide-angle end to a telephoto end, the first lens group is moved in a direction of an optical axis and the second lens group is moved to the object side in the direction of the optical axis such that an air interval between the first lens group and the second lens group is decreased and such that an air interval between the second lens group and the third lens group is increased.

The first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side.

Because both surfaces of the first lens as the negative lens of the first lens group are formed as aspheric surfaces as described above, the zoom lens provided in the image pickup device according to the embodiment of the present invention can correct negative distortion aberration and field curvature that occur noticeably at a wide-angle end when an angle of view is widened.

In addition, because both surfaces of the second lens as the positive meniscus lens of the first lens group are formed as aspheric surfaces, distortion aberration and astigmatism at the wide-angle end, which cannot be completely corrected by the first lens, can be corrected in a well-balanced manner. In addition, because both surfaces of the second lens as the positive meniscus lens of the first lens group are formed as aspheric surfaces, spherical aberration at the telephoto end which aberration occurs when a variable power ratio is increased can be corrected favorably.

Thus, because the first lens group is formed by the two lenses and both surfaces of each of the first lens and the second lens are formed as aspheric surfaces, the zoom lens provided in the image pickup device according to the embodiment of the present invention can be reduced in size and ensure high optical performance with a wider angle of view and a higher variable power.

In particular, total length of the zoom lens provided in the image pickup device according to the embodiment of the present invention can be shortened at a time of being collapsed when the zoom lens according to the embodiment of the present invention is applied to a collapsible image pickup device of a type having a lens barrel that extends and contracts.

FIG. 33 is a block diagram of a digital still camera in accordance with one embodiment of an image pickup device according to the present invention.

An image pickup device (digital still camera) 100 includes: a camera block 10 configured to perform an image pickup function; a camera signal processing section 20 configured to perform signal processing such as analog-to-digital conversion and the like on a taken image signal; an image processing section 30 configured to record and reproduce the image signal; an LCD (liquid crystal display) 40 for displaying a taken image and the like; an R/W (Reader/Writer) 50 configured to write the image signal to a memory card 1000 and to read the image signal; a CPU (Central Processing Unit) 60 configured to control the whole of the image pickup device; an input section 70 composed of various switches and the like on which a necessary operation is performed by a user; and a lens driving control section 80 configured to control the driving of lenses disposed in the camera block 10.

The camera block 10 includes for example an optical system including a zoom lens 11 (zoom lens 1, 2, 3, 4, 5, 6, 7, or 8 to which each of the embodiments of the present invention is applied) and an image pickup element 12 such as a CCD (Charge Coupled Device), a CMOS (Complementary Metal Oxide Semiconductor) image pickup element or the like.

The camera signal processing section 20 performs various signal processing such as conversion of an output signal from the image pickup element 12 into a digital signal, noise removal, image quality correction, conversion to a luminance and a color-difference signal, and the like.

The image processing section 30 performs a process of compression coding and expansion decoding of an image signal on the basis of a predetermined image data format, a process of converting resolution and other data specifications, and the like.

The LCD 40 has a function of displaying a state of operation on the input section 70 by a user and various data such as a taken image and the like.

The R/W 50 writes image data coded by the image processing section 30 to the memory card 1000 and reads image data recoded on the memory card 1000.

The CPU 60 functions as a control processing section for controlling each circuit block provided in the image pickup device 100. The CPU 60 controls each circuit block on the basis of an instruction input signal from the input section 70 and the like.

The input section 70 is for example formed by a shutter release button for performing a shutter operation, a selector switch for selecting an operation mode, and the like. The input section 70 outputs an instruction input signal corresponding to an operation by a user to the CPU 60.

The lens driving control section 80 controls for example a motor not shown in the figure for driving each lens of the zoom lens 11 on the basis of a control signal from the CPU 60.

The memory card 1000 is for example a semiconductor memory detachable from a slot connected to the R/W 50.

Operation in the image pickup device 100 will be described in the following.

In a standby state for picture taking, under control of the CPU 60, an image signal taken in the camera block 10 is output to the LCD 40 via the camera signal processing section 20, and is displayed as a camera-through image. When an instruction input signal for zooming is input from the input section 70, the CPU 60 outputs a control signal to the lens driving control section 80, and a predetermined lens of the zoom lens 11 is moved under control of the lens driving control section 80.

When a shutter not shown in the figure in the camera block 10 is operated by an instruction input signal from the input section 70, a taken image signal is output from the camera signal processing section 20 to the image processing section 30, subjected to compression coding, and converted to digital data in a predetermined data format. The converted data is output to the R/W 50, and written to the memory card 1000.

Incidentally, focusing is performed by moving a predetermined lens of the zoom lens 11 by the lens driving control section 80 on the basis of a control signal from the CPU 60 when the shutter release button of the input section 70 is pressed halfway or pressed all the way for recording (photographing), for example.

When image data recorded on the memory card 1000 is reproduced, the predetermined image data is read from the memory card 1000 by the R/W 50 according to an operation on the input section 70, and subjected to expansion decoding by the image processing section 30. Thereafter, a reproduced image signal is output to the LCD 40, and a reproduced image is displayed.

Incidentally, while in the foregoing embodiment, an example of applying the image pickup device to a digital still camera has been shown, the scope of application of the image pickup device is not limited to the digital still camera. The image pickup device is widely applicable as for example a camera section of digital input-output devices such as a digital video camera, a portable telephone including a camera, a PDA (Personal Digital Assistant) including a camera, and the like.

The shapes and numerical values of respective parts illustrated in each of the foregoing embodiments are each a mere example of embodiment in carrying out the present invention, and the technical scope of the present invention is not to be construed in a restricted manner by these shapes and numerical values.

It should be understood by those skilled in the art that various modifications, combinations, sub-combinations and alternations may occur depending on design requirements and other factors insofar as they are within the scope of the appended claims or the equivalent thereof.

The present application contains subject matter related to that disclosed in Japanese Priority Patent Application JP 2008-228462 filed in the Japan Patent Office on Sep. 5, 2008, the entire content of which is hereby incorporated by reference.

What is claimed is:

1. A zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein the surface on the image side of said second lens is formed such that a negative refractive power is weakened as distance from an optical axis is increased, and said zoom lens is formed so as to satisfy a following conditional expression (1):

$$0.40 < |Sgf/Sgr| < 2.10 \quad (1)$$

where Sgf denotes a difference between an amount of sag of a paraxial radius of curvature of the surface on the object side in an effective diameter of the second lens and an amount of sag of an aspheric shape, and Sgr denotes a difference between an amount of sag of a paraxial radius of curvature of the surface on the image side in the effective diameter of the second lens and an amount of sag of an aspheric shape.

2. A zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said zoom lens is formed so as to satisfy a following conditional expression (2) and a following conditional expression (3):

$$1.00 < |f12/f1| < 2.00 \quad (2)$$

$$1.00 < t1/fw < 1.60 \quad (3)$$

where f12 denotes a focal length of the second lens, f1 denotes a focal length of the first lens group, t1 denotes a thickness on an optical axis of the first lens group, and fw denotes a focal length at the wide-angle end in an entire lens system.

3. A zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said zoom lens is formed so as to satisfy a following conditional expression (4) and a following conditional expression (5):

$$N12 > 1.90 \quad (4)$$

$$v12 < 25 \quad (5)$$

where N12 denotes an index of refraction at a d-line of the second lens, and v12 denotes an Abbe number at the d-line of the second lens.

4. A zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said second lens group is formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

5. An image pickup device comprising:

a zoom lens; and an image pickup element for converting an optical image formed by the zoom lens into an electric signal, wherein said zoom lens is formed by arranging a first lens group having a negative refractive power, a second lens group having a positive refractive power, and a third lens group having a positive refractive power in order from an object side to an image side, at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein the surface on the image side of said second lens is formed such that a negative refractive power is weakened as distance from an optical axis is increased, and said zoom lens is formed so as to satisfy a following conditional expression (1):

$$0.40 < |Sgf/Sgr| < 2.10 \qquad (1)$$

where Sgf denotes a difference between an amount of sag of a paraxial radius of curvature of the surface on the object side in an effective diameter of the second lens and an amount of sag of an aspheric shape, and Sgr denotes a difference between an amount of sag of a paraxial radius of curvature of the surface on the image side in the effective diameter of the second lens and an amount of sag of an aspheric shape.

6. An image pickup device comprising:

a zoom lens; and an image pickup element for converting an optical image formed by the zoom lens into an electric signal, wherein said zoom lens is formed by arranging a first lens group having a negative refractive power, a second lens group having a positive refractive power, and a third lens group having a positive refractive power in order from an object side to an image side, at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said zoom lens is formed so as to satisfy a following conditional expression (2) and a following conditional expression (3):

$$1.00 < |f12/f1| < 2.00 \qquad (2)$$

$$1.00 < t1/fw < 1.60 \qquad (3)$$

where f12 denotes a focal length of the second lens, f1 denotes a focal length of the first lens group, t1 denotes a thickness on an optical axis of the first lens group, and fw denotes a focal length at the wide-angle end in an entire lens system.

7. An image pickup device comprising:

a zoom lens; and an image pickup element for converting an optical image formed by the zoom lens into an electric signal, wherein said zoom lens is formed by arranging a first lens group having a negative refractive power, a second lens group having a positive refractive power, and a third lens group having a positive refractive power in order from an object side to an image side, at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said zoom lens is formed so as to satisfy a following conditional expression (4) and a following conditional expression (5):

$$N12 > 1.90 \qquad (4)$$

$$v12 < 25 \qquad (5)$$

where N12 denotes an index of refraction at a d-line of the second lens, and v12 denotes an Abbe number at the d-line of the second lens.

8. An image pickup device comprising:

a zoom lens; and an image pickup element for converting an optical image formed by the zoom lens into an electric signal, wherein said zoom lens is formed by arranging a first lens group having a negative refractive power, a second lens group having a positive refractive power, and a third lens group having a positive refractive power in order from an object side to an image side, at a time of varying power from a wide-angle end to a telephoto end, said first lens group is moved, and said second lens group is moved to the object side such that an air interval between said first lens group and said second lens group is decreased and such that an air interval between said second lens group and said third lens group is increased, and said first lens group is formed by arranging a first lens as a negative lens having both surfaces formed as aspheric surfaces and having a concave surface facing the image side and a second lens as a positive meniscus lens having both surfaces formed as aspheric surfaces and having a convex surface facing the object side in order from the object side to the image side, wherein said second lens group is formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

* * * * *